United States Patent
Seals et al.

(10) Patent No.: US 10,828,865 B1
(45) Date of Patent: *Nov. 10, 2020

(54) TOUGHENED AND CORROSION- AND WEAR-RESISTANT COMPOSITE STRUCTURES AND FABRICATION METHODS THEREOF

(71) Applicant: Consolidated Nuclear Security, LLC, Oak Ridge, TN (US)

(72) Inventors: Roland D. Seals, Oak Ridge, TN (US); Edward B. Ripley, Knoxville, TN (US); Russell L. Hallman, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 759 days.

This patent is subject to a terminal disclaimer.

(21) Appl. No.: 15/602,684

(22) Filed: May 23, 2017

Related U.S. Application Data

(60) Continuation-in-part of application No. 14/182,327, filed on Feb. 18, 2014, now Pat. No. 9,682,531, which is a division of application No. 12/122,024, filed on May 16, 2008, now Pat. No. 8,691,343.

(51) Int. Cl.

| | | |
|---|---|---|
| B22D 19/00 | (2006.01) | |
| B22D 19/16 | (2006.01) | |
| B32B 7/05 | (2019.01) | |
| B23K 35/32 | (2006.01) | |
| B23K 35/34 | (2006.01) | |
| C09D 1/00 | (2006.01) | |
| C23C 12/02 | (2006.01) | |
| C23C 18/08 | (2006.01) | |
| C23C 18/12 | (2006.01) | |
| C23C 26/00 | (2006.01) | |
| B32B 15/04 | (2006.01) | |

(52) U.S. Cl.
CPC .............. *B32B 7/05* (2019.01); *B23K 35/325* (2013.01); *B23K 35/327* (2013.01); *B23K 35/34* (2013.01); *B32B 15/04* (2013.01); *C09D 1/00* (2013.01); *C23C 12/02* (2013.01); *C23C 18/08* (2013.01); *C23C 18/1204* (2013.01); *C23C 18/1241* (2013.01); *C23C 18/1275* (2013.01); *C23C 26/00* (2013.01); *Y10T 428/24802* (2015.01); *Y10T 428/24826* (2015.01); *Y10T 428/31678* (2015.04)

(58) Field of Classification Search
CPC ..... B22D 19/00; B22D 19/0081; B22D 19/16
USPC ...................... 164/75, 98; 148/527
See application file for complete search history.

(56) References Cited

U.S. PATENT DOCUMENTS

| | | | | |
|---|---|---|---|---|
| 4,673,550 A | * | 6/1987 | Dallaire et al. | C01B 35/04 419/12 |
| 5,505,246 A | * | 4/1996 | Colvin et al. | B22C 3/00 164/158 |
| 5,664,616 A | * | 9/1997 | Gegel | B22D 19/14 164/105 |
| 8,691,343 B2 | * | 4/2014 | Seals et al. | B23K 35/325 427/383.1 |
| 9,682,531 B2 | * | 6/2017 | Seals et al. | B23K 35/325 |
| 2002/0102400 A1 | * | 8/2002 | Gorokhovsky et al. | C23C 14/022 428/336 |

* cited by examiner

*Primary Examiner* — Kevin P Kerns

(74) *Attorney, Agent, or Firm* — Luedeka Neely Group, P.C.; Michael J. Renner, Esq.

(57) ABSTRACT

Composite structures having a reinforced material intermingled with a substrate wherein the reinforced material includes titanium monoboride, titanium diboride, or a combination thereof.

22 Claims, 16 Drawing Sheets

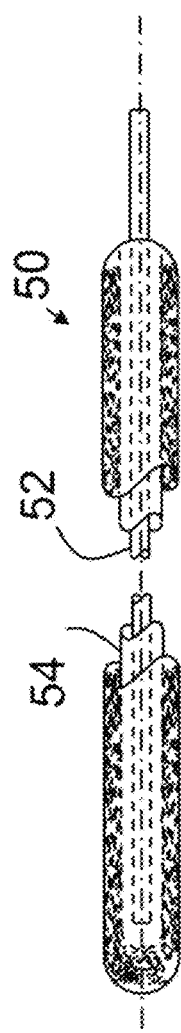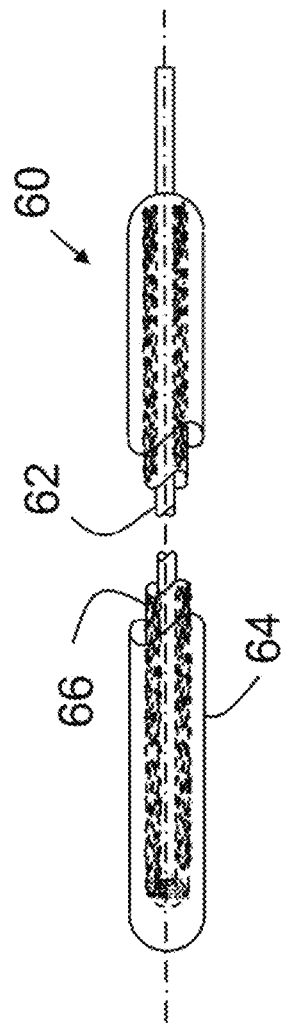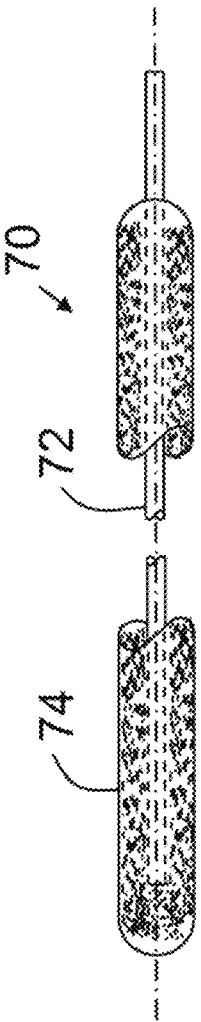

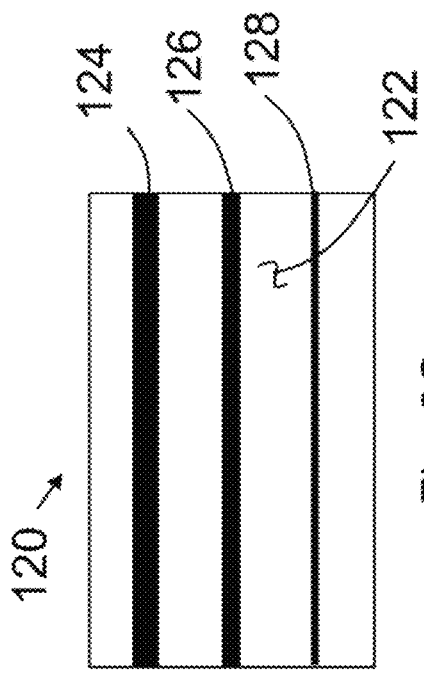
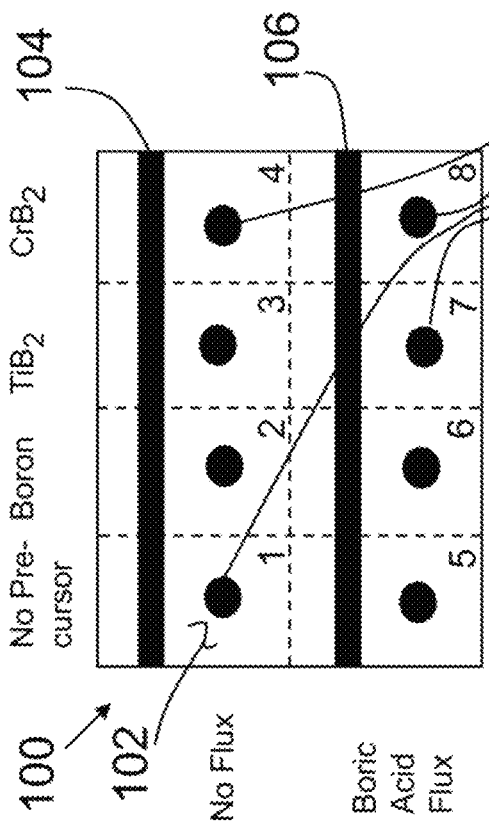
Fig. 8A
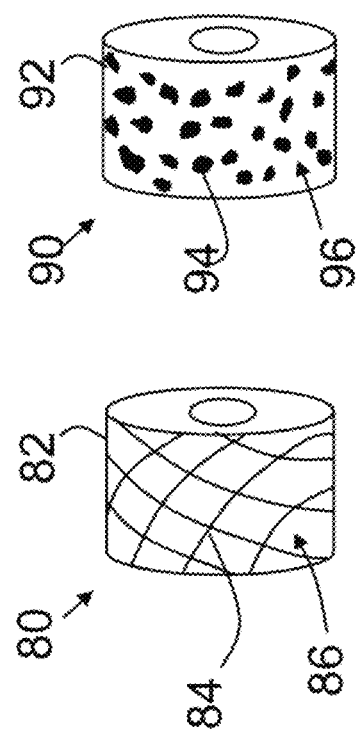
Fig. 7A
Fig. 7B
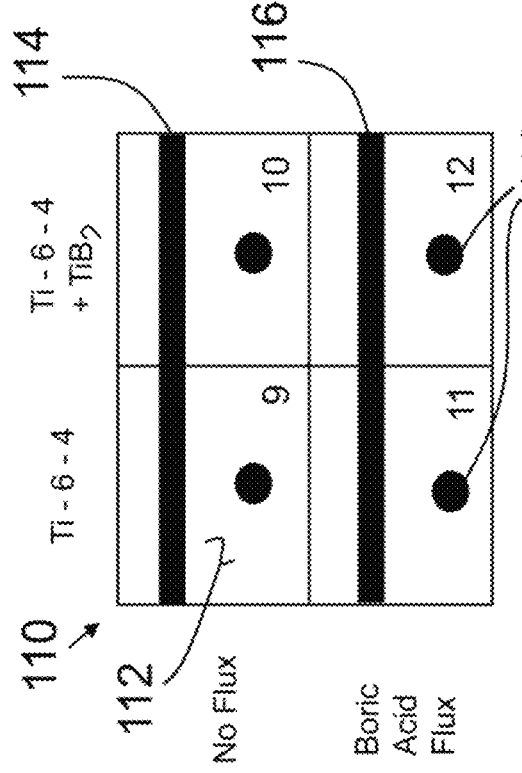
Fig. 8B
Fig. 8C

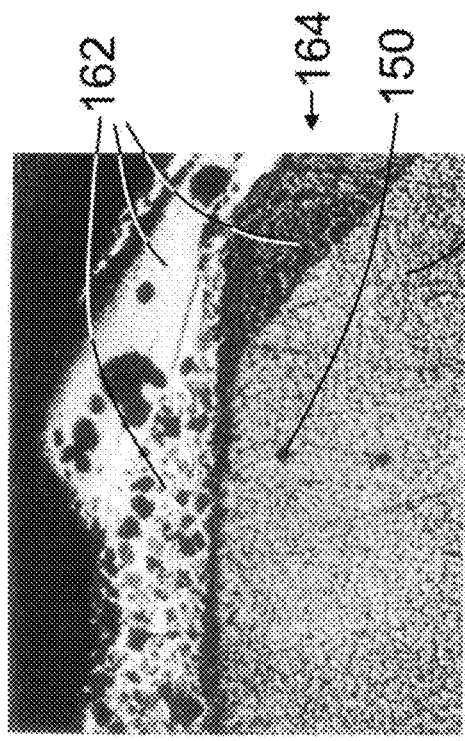
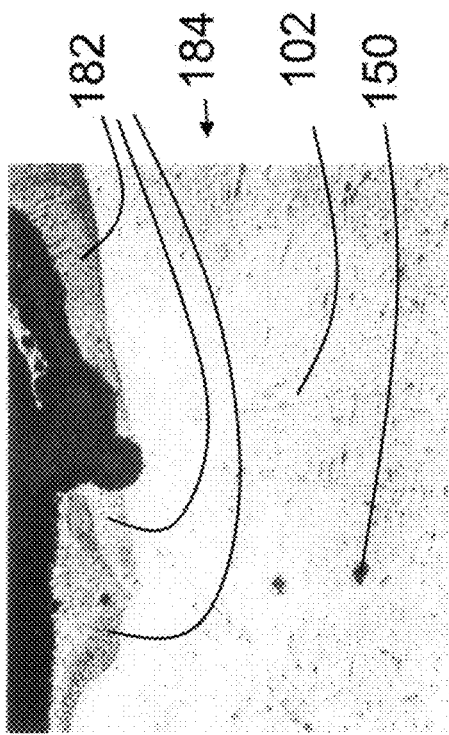
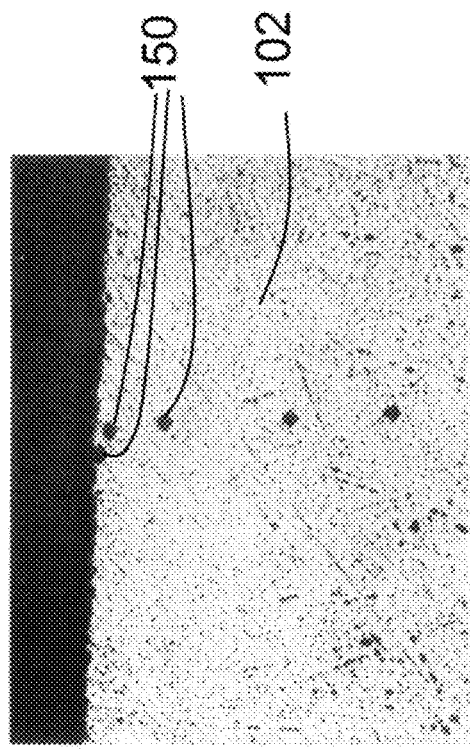
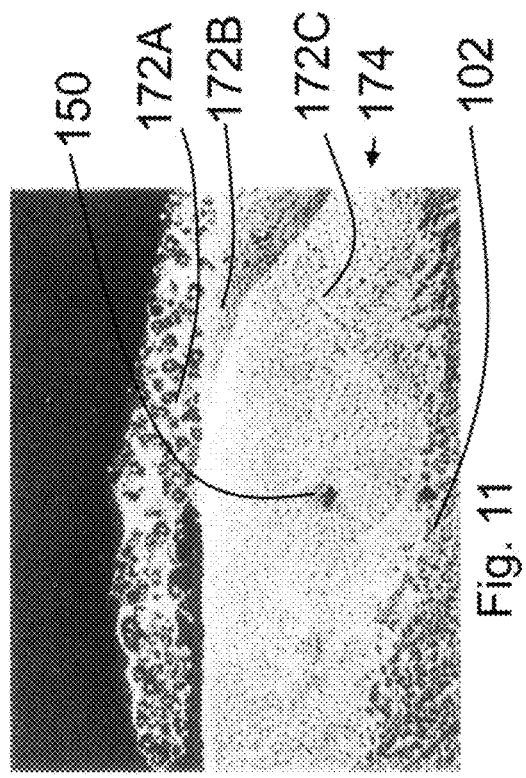

TOUGHENED AND CORROSION- AND WEAR-RESISTANT COMPOSITE STRUCTURES AND FABRICATION METHODS THEREOF

CROSS REFERENCE TO RELATED APPLICATION

This application is a continuation-in-part of U.S. patent application Ser. No. 14/182,327, filed on Feb. 18, 2014, which was granted as U.S. Pat. No. 9,682,531, which was a divisional of U.S. patent application Ser. No. 12/122,024, filed May 16, 2008, which was granted as U.S. Pat. No. 8,691,343, both of which are entitled "Toughened and Corrosion- and Wear-Resistant Composite Structures and Fabrication Methods Thereof" and are incorporated by reference herein.

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of coatings and surface treatments for metals. More particularly, this disclosure relates to the formation of reinforced titanium and boron materials interjoined with substrates to provide a composite structure.

BACKGROUND

Titanium alloys, aluminum alloys, and steels have physical and chemical properties that are often desirable for a wide variety of static structural applications. However, these alloys often do not provide the wear and corrosion resistance that is required in many rotating or reciprocating machine applications such as in aircraft propeller blades, compressor turbine blades, bearings, pistons, and similar wear parts and dynamic machinery components. For example, titanium alloys have attractive properties such as high specific strength and stiffness, relatively low density, and excellent corrosion resistance, but titanium alloys typically have poor resistance to wear and oxidation at high temperatures. Aluminum castings are light in weight but provide little resistance to galling and other wear-related phenomena even at moderate temperatures. Steels have high strength and may be surface hardened by such techniques as nitriding and carbiding, but still the wear resistance of such surface-hardened steel alloys is inadequate for many applications.

Techniques such as plasma spraying, sputtering, and plating have been developed to add a wear resistance layer to the surface of metal substrates. However these techniques often result in distortion of substrate geometry, reduction of surface smoothness, and eventual delamination of the added layer from the substrate. Therefore better materials and techniques are needed for improving the corrosion and wear resistance of the surfaces of metals.

SUMMARY

In one embodiment, the present disclosure provides a method of making a composite structure that includes (a) heating at least a surface portion of a substrate to a temperature above the melting point of the substrate; (b) disposing a precursor material comprising titanium and a boron source on the surface portion of the substrate; and (c) forming a reinforced material with the precursor material interjoined with the surface portion of the substrate to provide the composite structure. According to certain embodiments, step (a) comprises melting an entire portion of the substrate and step (b) comprises flowing the melted substrate into a mold cavity coated with the precursor material. In some embodiments, step (b) comprises disposing a precursor material comprising titanium diboride and a β-titanium stabilizer on the at least a portion of the substrate. According to some embodiments, step (b) comprises disposing a slurry, glaze, or paste comprising titanium diboride on the heated surface portion of the substrate. According to certain embodiments, the substrate is a titanium-bearing substrate, an iron-bearing substrate, an aluminum-bearing substrate, or a non-titanium bearing substrate. In preferred embodiments, the reinforced material includes a compound selected from the group consisting of titanium monoboride, titanium diboride, and combinations thereof disposed at least partially below the surface portion of the composite structure.

According to another embodiment of the disclosure, a method of making a composite structure includes the steps of (a) coating a mold cavity with a precursor material comprising titanium and a boron source; (b) melting a substrate; (c) flowing the melted substrate into the mold cavity; and (d) forming a reinforced material in the mold cavity with the precursor material interjoined with the surface portion of the substrate to provide the composite structure.

A welding rod embodiment is also provided. The welding rod includes a metal electrode and a precursor material is disposed adjacent at least a portion of the metal electrode. The precursor material includes a material selected from the group consisting of: titanium diboride, titanium monoboride, and a combination thereof.

A material for use in forming a composite structure is further provided. The material typically includes a precursor material that includes a flux and a material selected from the group consisting of: titanium diboride, titanium monoboride, and a combination thereof.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIGS. 6A-6C are somewhat schematic cross-sections of welding rods.

FIGS. 7A and 7B are somewhat schematic perspective views of grinders.

FIG. 8A is a schematic layout of reinforced materials interjoined with a Ti substrate.

FIG. 8B is a schematic layout of reinforced materials interjoined with a mild steel substrate.

FIG. 8C is a schematic layout of reinforced materials interjoined with a Ti substrate.

FIG. 9 is a photomicrograph of a cross section of a Ti substrate.

FIGS. 10-16 are photomicrographs of cross-sections of reinforced materials interjoined with a Ti substrate.

DETAILED DESCRIPTION

Figure 1:
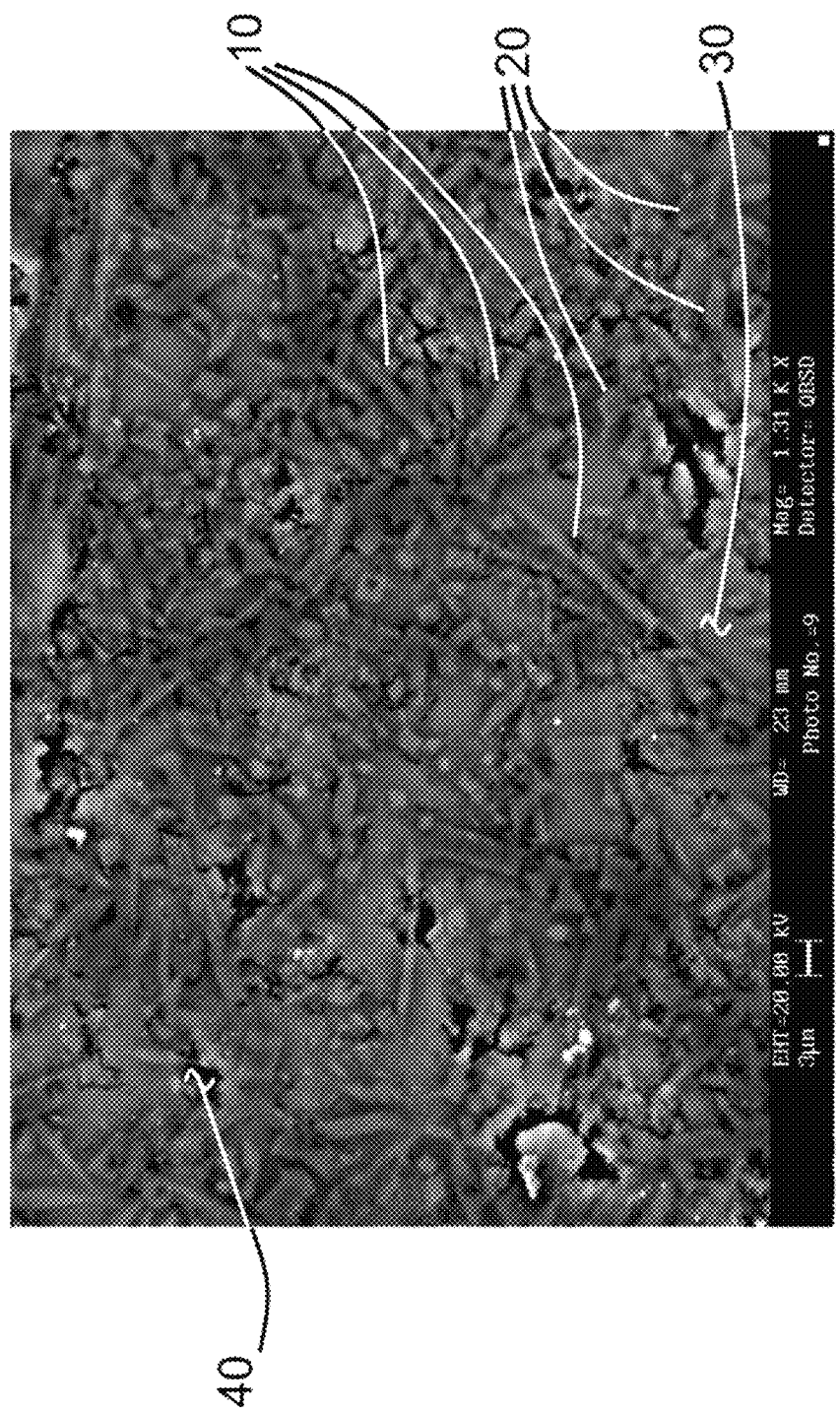
FIG. 1 is a photomicrograph of an as-reacted TiB composite material morphology on a Ti substrate.

In the following detailed description of the preferred embodiments, reference is made to the accompanying drawings, which form a part hereof, and within which are shown by way of illustration the practice of various embodiments of reinforced material structures that are interjoined with suitable substrates to form composite structures, and methods for forming such reinforced materials and creating composite structures. It is to be understood that other embodiments may be utilized, and that structural changes may be made and processes may vary in other embodiments.

Various embodiments described herein provide methods for forming a reinforced material that is interjoined with a substrate. A reinforced material may be formed over the entire surface or over only a portion of the surface of a substrate. Substrate materials may include elemental metals or metal alloys such as titanium or titanium alloys, or aluminum or iron or aluminum or ferrous or other non-titanium metals or alloys, or ceramics, polymers, composites, and combinations thereof. In some embodiments the substrate is titanium. In some embodiments the substrate is a titanium alloy. In some embodiments the substrate is an aluminum alloy. In some embodiments the substrate is a ferrous alloy or steel.

The process of forming a reinforced material interjoined with a substrate typically involves disposing a precursor material on the substrate and then heating the precursor material and heating at least a portion of the substrate until at least a portion of the precursor material forms a reinforced material interjoined with the substrate. The result is a "composite structure." The composite structure is the combination of the reinforced material and the substrate and the regions where they are interjoined. In some cases the substrate and the reinforced material may entirely intermingle, in which case the reinforced material and the substrate are still considered to be interjoined, and the composite structure is the intermingled materials.

A precursor material may include a single ingredient such as titanium diboride, or a precursor material may include multiple ingredients such as boron and titanium. When reference is made to a precursor material comprising a chemical element such as boron or titanium, it is meant the precursor material includes the chemical element as elemental material (e.g., titanium metal or boron metal), or as a compound of the metal, or as an alloy (such as the Ti-6-4 alloy), or an inter-metallic (such as TiAl), or as a mixture or blend of the metal, or as a combination of these forms.

The process of interjoining typically involves heating the precursor material and heating at least a portion of the substrate to provide the composite structure. As a result of the process one or more of the following effects may occur to form a composite structure: at least a portion of the precursor material may diffuse into the substrate, a portion of the substrate may diffuse into the precursor material, at least a portion of the precursor material may be bonded to the substrate, at least a portion of the precursor material may alloy with the substrate, and/or at least a portion of the precursor material and at least a portion of the substrate may form a mixture.

After processing, the reinforced material that is interjoined with the substrate may have substantially the characteristics of a coating on the surface of the substrate, or the reinforced material may have substantially the characteristics of a modification of the surface of the substrate. The nature of the reinforced material that results from a process for applying a reinforced material to the substrate, i.e., whether the process results in a coating or in a surface modification, depends upon the substrate material, the deposited material, and the specific processing parameters that are used to form the reinforced material. In the cases where the end result is a coating, at least a portion of the deposited material adheres to the surface of the substrate. In the case of surface modification, a portion of the deposited material is intermingled with a portion of the material at the surface of a substrate where a reinforced material is formed. The resultant modification of the surface may include the formation of an alloy or a new combination of materials at or below the original surface of the substrate.

Typically the formation of reinforced materials as disclosed herein involves various material microstructure modifying mechanisms, including sintering, alloying and precipitation. Sintering refers to densification and chemical bonding of adjacent particles which is affected by heating to a temperature near (and preferably below) the melting point of both the substrate and precursor material. Sintering may occur at the interface between the coating and the underlying substrate surface to improve interfacial adhesion. In addition, sintering may occur within the coating material itself, to improve densification and mechanical strength of the coating material. The term alloying refers to heating the substrate and coating materials above their respective melting points to produce an interface comprising a mixture of the substrate and coating materials. Alloying is a desirable mechanism for producing improved adhesion between the coating and a portion of the underlying substrate. The term precipitation describes a material modification process whereby the material being modified, i.e., the deposited material and/or the substrate surface, is heated to produce a new solid phase which gradually precipitates within the particular solid alloy material as a result of slow, subsurface chemical reaction. This type of reaction is generally used to harden a substrate surface.

In some embodiments the precursor material is provided in powder form. In some embodiments the powder may be mixed with a liquid suspension medium, or carrier, to form a slurry. The term slurry is used to describe a precursor material having a watery consistency and comprising insoluble matter in a liquid. The carrier acts as a medium for carrying or transporting the coating materials to the substrate surface. For example, the liquid carrier may consist of water, alcohol, a water-alcohol mixture, an alcohol-ethylacetoacetate mixture, or an alcohol-acetone mixture, to name just a few. The carrier is typically evaporated when the precursor material is heated to form the reinforced material. There are a number of commercially-available suspension media that may be used. For example, experiments were performed using HPC, the commercial designation of a carrier medium manufactured by ZYP Coatings, Inc. of Oak Ridge, Tenn. This particular suspension medium consists of approximately 98% water and approximately 2% Mg—Al-silicate.

The slurry may comprise additional components for controlling physical characteristics of the slurry. For example, surface active agents, or surfactants, such as sodium lauryl sulfate, polyvinyl alcohol and water-soluble linear polyethylene glycols (PEGs) available from Dow Chemical Co. of Midland, Mich. under the tradename CARBOWAX, may be added to maintain suspension of the solid phase. Lubricants, such as stearic acid, may be added to assist in consolidation of the slurry components.

In some embodiments a precursor material may be formed with a binder, such as an organic or plastic material, a solder or a brazing alloy, or similar material. The binder is a material that acts as an adhesive to hold the precursor material together. In some embodiments the precursor material and the binder may be formed as a sheet or a tape and in some embodiments the precursor material and the binder may be formed as a paste. In many embodiments the binder has a low melting temperature, meaning that the binder has a melting point below the melting point of the other components of the precursor material or the melting point of the substrate. Upon melting, the binder wets to the substrate surface and wets/embodies the coating powder particles. In some instances, the binder material, like the carrier in a slurry, is evaporated or pyrolized when the precursor material is heated to form the reinforced material. In other instances, all or a portion of the binder may remain in the formed reinforced material, acting as a part of the matrix material.

Typically, a powder, slurry, or paste that is the precursor material is disposed on a substrate by brushing, rollering, spray-drying, or spray-painting. However, one skilled in the art will recognize that alternate deposition methods may also be used. For example, the surface to be protected may be immersed in the mixture or a slurry may be spray-dried upon the substrate. Another example of a precursor material deposition process is thermal spraying. Thermal spraying is adaptable to the deposition of ceramics, metals and metal alloys, polymers, composites, ceramic-metals and multi-component, graded, or multilayered combinations of these materials. Yet another example of a precursor material deposition process includes applying the precursor material as a coating to an interior surface of a metal casting mold. According to certain embodiments, the precursor material is used as a replacement for current mold washes in casting operations. According to other embodiments, the precursor material is added to an existing mold wash or is applied as a coating over an existing mold wash. As explained further below, the precursor material would then be disposed on the substrate as the substrate is poured into the mold cavity. Optionally, including a suspension medium and/or binder in the precursor material will assist in creating a more durable mold wash and preventing the precursor material from eroding, being dislodged, and/or flowing down the sides of the mold cavity as the melted substrate is poured into the mold cavity.

When the precursor material is a slurry or a paste, it is referred to herein as a "glaze." The glaze may be allowed to dry or cure (or may be forced to dry or cure by heating it to a temperature that is typically between 500° C. and 1000° C.) before heating the glaze to form the reinforced material interjoined with the substrate to form a composite structure. Temperatures lower than 500° C. may be used to dry or cure the glaze in embodiments where a low boiling point carrier like alcohol is used to form the glaze.

Typically, the reinforced material is reactively formed by heating the deposited material and the substrate surface by using laser, plasma, infrared, electron beam, gas torch, or electric arc (e.g., tungsten inert gas [TIG]) heating sources. Such heating techniques that heat only a local area of a substrate are referred to as "localized surface heating techniques." In contrast, "bulk material heating techniques" refer to techniques that heat an entire substrate such as gas, electric, or microwave ovens, or induction or other types of furnaces.

Formation of a reinforced material on a substrate is preferably accomplished by heat-treating the precursor material using a high heat flux process such as infrared (IR) radiation. In contrast to many other heating techniques, IR radiation heating provides a means for rapidly heating the deposited material while maintaining a substantially lower substrate temperature. Infrared radiation heating is preferably performed in an IR heating furnace. A variety of IR sources are available. For instance, tungsten-halogen based IR sources or a more powerful IR furnace, incorporating a plasma-based IR source, are available. The plasma-based IR furnace typically operates as a line-focus type system, where the precursor materials are heated by an IR beam as it scans across the substrate.

Preferably the formation of the reinforced material is accomplished by first heating, for up to a few seconds, the precursor material and the substrate to a temperature above the α-to-β phase transformation temperature (e.g., approximately 884° C. for TiB coating materials) but below the eutectic temperature (e.g., approximately 1540° C. for TiB coating materials). Then preferably the precursor material and the surface of the substrate are heated, for up to a few seconds, to a temperature slightly above the melting temperature of the substrate. By maintaining the bulk temperature of the substrate below its melting temperature, the reinforced material is formed while maintaining much of the microstructure of the underlying substrate material.

The temperature to which the precursor material and the substrate are heated may be accurately controlled by varying the intensity of IR radiation and the time of exposure to the IR radiation source. The intensity of IR radiation and time of exposure to IR radiation will generally vary depending on characteristics of the substrate and deposited materials, and the coating or surface modification that is desired. For most applications, the IR exposure time ranges from 1 to 300 seconds, with an exposure time of 30 to 60 seconds being preferred. The preferred IR intensity, or heat flux density, will generally range up to a maximum value of about 3,500 Watts/cm$^2$. However, these variables are application-specific and deviations therefrom may be employed. The time of exposure to heat (as by IR radiation) may be varied to control the extent of base metal dissolution into the coating, thereby controlling the thickness and final composition of the coating. For instance, particular applications may incorporate non-uniform and/or non-continuous heating profiles to produce coating thickness variations or coating composition gradient structures.

Infrared heating rapidly increases coating density by eliminating pores formed in the coating during deposition. IR heating also typically improves the cohesiveness of the coating material and/or the adhesion of the coating material to the substrate surface. It may be desirable to separately heat a portion of the substrate surface in addition to heating the deposited material, such that the microstructure of the heated portion of the substrate surface is altered. The degree to which the substrate surface microstructure is altered depends on a number of factors, including the materials from which the substrate is formed and deposited materials that are used, duration of heating, and the microstructural properties desired.

Infrared heating is beneficial in that it may be applied to a variety of complex surface contours generally without requiring significant customization of the heating system configuration. Many alternative high heat flux methods require a physical coupling of the heat source to the coated surface, such as with an induction coil. A typical induction coil may not couple uniformly to the entire surface when the substrate surface geometry is complex. Therefore, avoiding non-uniform heating of the coating surface requires specially designing a coil that follows the contours of the particular substrate. Such customization is generally not required with IR heating. Although the specific intensity of the thermal energy may be expected to decrease as a function of distance between the IR source and the coating surface due to dispersion of the radiation, this decrease in energy is typically insignificant. Consequently, with IR heating a substrate coating may often be uniformly heated without any special effort to customize the heat source to accommodate the substrate's surface geometry. IR heating provides the further advantage of enabling the flexibility to heat (and thereby modify) selected portions of a surface. This is possible since the IR radiation may be directed or focused toward a particular surface area.

According to casting embodiments where the precursor material is applied as a coating to an interior surface of a metal casting mold, the substrate is heated/melted prior to application of the precursor material to the substrate. During the casting operation, the molten substrate flows into the mold and the precursor material on the interior surface of the mold interacts with the molten substrate as the casted part cools and solidifies. The localized heating described above occurs to the precursor material in the casting mold when the precursor material comes into contact with the already heated substrate, which forms the reinforced material on the surface of the solidified part. In other words, the molten substrate flowing into the mold cavity provides the required heat to form the reaction between the substrate and the precursor material as described herein.

Turning now to more particular aspects of various embodiments, the material that is deposited on a substrate typically consists of titanium or a titanium alloy powder, and boron or a boron containing material. In preferred embodiments the deposited material includes titanium metal and titanium diboride. The titanium metal acts as a source to feed the formation of TiB and TiB$_2$ and any residual titanium provides further corrosion resistance and hard second phase materials. A fluxing agent such as CaF$_2$ may be added to the precursor material in order to reduce oxidation of the substrate metal. Fluxing agents are materials that are used to prevent oxidation during heating operations, but that may be substantially entirely removed after heating the precursor material and that do not contribute any significant bonding, hardening, or wear resistance functionality to the reinforced material. The utility of a fluxing agent and the utility of a binder may be provided by a single material.

Si or B may be added as a self-fluxing material. The term self-fluxing material refers to a material that forms part of the reinforced material, and that contains elements for removing oxides (such as by dissolution or chemical reduction) and that facilitates wetting of the substrate. That is, self-fluxing materials "wet" the substrate and coalesce when heated to their melting point without the addition of a fluxing agent. Si or B act as self-fluxing materials in part because they tend to form eutectics with the other materials, which lower the reaction temperatures and reduce the oxidation rate. Boric acid (H$_3$BO$_3$) typically acts as a fluxing agent, but it may act as a self-fluxing material where the boron forms part of the reinforced material.

The term "flux" is used herein to refer to either a self-fluxing material or a fluxing agent, or a combination of a self-fluxing material and a fluxing agent. The absence of a flux generally hinders wetting of the substrate. Generally, precursor materials containing self-fluxing materials that are deposited on a substrate may be heated in regular open atmosphere without oxidation of the substrate. Materials not containing self-fluxing materials that are deposited on a substrate as a precursor material typically must be either (a) supplemented with a fluxing agent or (b) heated in a protective atmosphere during formation of the reinforced material in order to prevent oxidation of the substrate and/or the precursor materials. The protective atmosphere may be an evacuated environment, an inert gas environment, or a reducing gas environment. For example, an argon-hydrogen (4% H$_2$) atmosphere works well. The term "oxidation preventative" is used herein to refer to either (1) a protective atmosphere or (2) a fluxing agent or (3) a self-fluxing material, or (4) to a combination of two of the previous three or a combination of all of the previous three.

The formation of β-titanium is preferred in the reinforced material. A β-titanium stabilizer such as Mo and Nb powders (either dry or in liquid suspension) may be added to the precursor material in order to promote the formation of β-titanium.

Typically the precursor material is heated until the precursor material melts. Generally the heating is done in an inert atmosphere to minimize oxidation of the metallic substrate and/or the precursor material. A temperature above 1000° C. is typically required and preferably the surface of the metallic substrate being treated is at a temperature near the melting temperature of the substrate. As used herein the term "near the melting temperature of the substrate" means a temperature between approximately 60% and approximately 150% of the melting temperature of the substrate. Various techniques may be used to prevent the melting of the bulk of the substrate even though the temperature at the surface of a substrate exceeds its melting temperature. For example, the surface may be heated for a period of time that is short enough to prevent enough heat conduction into the body of the substrate to melt the substrate. Typically the result is that a thin reinforced material of titanium, titanium boride, and titanium diboride is interjoined with the substrate. Preferably the reinforced material is predominantly titanium monoboride in the presence of titanium, and the reinforced material preferably includes β-Ti. The reinforced material may also include titanium diboride, borides of chromium, tantalum, iron, nickel, and other metal alloys, and, in some cases, carbides of these metals. When a fluxing agent or a self-fluxing material is used and the flux forms slag crusts after the reactive heating or melting, little or no slag typically remains in the resultant reinforced material.

The composite structures formed by these techniques result in a change to at least the surface characteristics of a substrate, typically to provide a composite structure having properties of high hardness, high temperature strength, and wear and corrosion resistance. These changes may be made adjacent the surface of the substrate without changing the bulk material properties (e.g., density, modulus of elasticity, yield strength) of the substrate. In some composite structure embodiments discernible layers of reinforced materials are formed interjoined with the substrate. In some embodiments, functionally graded reinforced materials may be interjoined with the substrate, a configuration that tends to increase bonding strength and adherence and mitigate differences in coefficient of thermal expansion (CTE). In some embodiments the process of forming the reinforced material modifies the substrate from its surface to a depth under the surface of approximately five microns or less. In some embodiments the process of forming the reinforced material modifies the substrate from its surface to a depth of approximately ten centimeters or so. In some embodiments the process of forming the reinforced material modifies the entire bulk of the substrate and the resulting composite structure contains no significant amount of unmodified substrate material. The reinforced materials may be fabricated on finished components by portable, field techniques or may be fabricated on bulk (e.g., sheet) materials prior to final manufacturing steps.

In preferred embodiments high aspect ratio particles of TiB are formed as part of the reinforced material. "High aspect ratio" particles refers to particles with three-dimensional morphologies wherein one dimension of a particle is approximately at least five times longer than either of the other two dimensions of the particle. The high-aspect ratio morphology is preferred because it provides improvements in stiffness, strength, creep resistance, and hardness of the reinforced material.

FIGS. 1-4 present photomicrographs illustrating the results of disposing and interjoining either $TiB_2$ on a Ti substrate or B+Ti on a Ti substrate to form a reinforced material that is interjoined with the substrate. These and other precursor material formulations may include a flux such as boric acid. When $TiB_2$ is used as a precursor material on a Ti substrate a reaction that may occur in the process of forming a reinforced material is $TiB_2+Ti \rightarrow 2TiB$. When B is used as precursor with a Ti substrate, the reaction product (reinforced material) is predominantly also TiB because of the presence of titanium from the substrate.

On non-titanium substrates a source of titanium and boron is needed in the precursor material in order to form $TiB_2$ or TiB as reinforced material. It should be noted that in any reaction between Ti and B, TiB is formed first (rather than $TiB_2$), but if enough time and heat is provided for the reaction to go to equilibrium, $TiB_2$ will be the dominant compound produced, unless excess titanium is available. "Excess titanium" is titanium that is present in sufficient stoichiometric quantity to convert into titanium monoboride (TiB) substantially any titanium diboride ($TiB_2$) that is either present in the precursor material or that forms during the reaction process. According to the phase diagram of FIG. 5, TiB has boron at an atomic percent of 50% and a weight percent of 18.4% whereas $TiB_2$ has boron at an atomic percent of 66.7% and a weight percent of 31.1%. Therefore, for example, if the B:Ti atomic ratio is 1:1 (meaning that the atomic % ratio between B and Ti is 50:50 atomic %), then substantially only TiB is formed. That is, for TiB formation the mole ratio is 1:1 (e.g., 47.90 grams [or 1 mole] of Ti (81.6 wt. %) to 10.81 grams [or 1 mole] of B (18.4 wt. %). If the B:Ti atomic ratio is 2:1 (meaning that the B:Ti atomic % ratio is 66.7:33.3 atomic %) then substantially only $TiB_2$ is formed. That is, for $TiB_2$ formation the mole ratio is 2 moles of B to every 1 mole of Ti (e.g., 47.90 grams [or 1 mole] of Ti (68.9 wt. %) to 21.62 grams [or 2 moles] of B (31.1 wt. %).

Titanium that is present to react with boron and produce TiB and/or $TiB_2$ but is not present in sufficient stoichiometric quantity to convert substantially all $TiB_2$ to TiB at equilibrium is referred to herein as "available titanium." Available titanium and excess titanium may be provided by titanium that is present in the substrate or may be provided by a source of titanium that is included as a precursor material disposed on the substrate as part of the process to form the reinforced material. Examples of a source of titanium that may be included in a precursor material disposed on the substrate include titanium metal, titanium alloys such as the Ti-6-4 alloy, Ti inter-metallics such as TiAl, Ti blends, and other titanium compounds, especially those that have thermodynamically favored reactions with $TiB_2$. The formation of reinforced materials interjoined with a substrate may occur in the presence of available titanium or in the presence of excess titanium.

Figure 2:
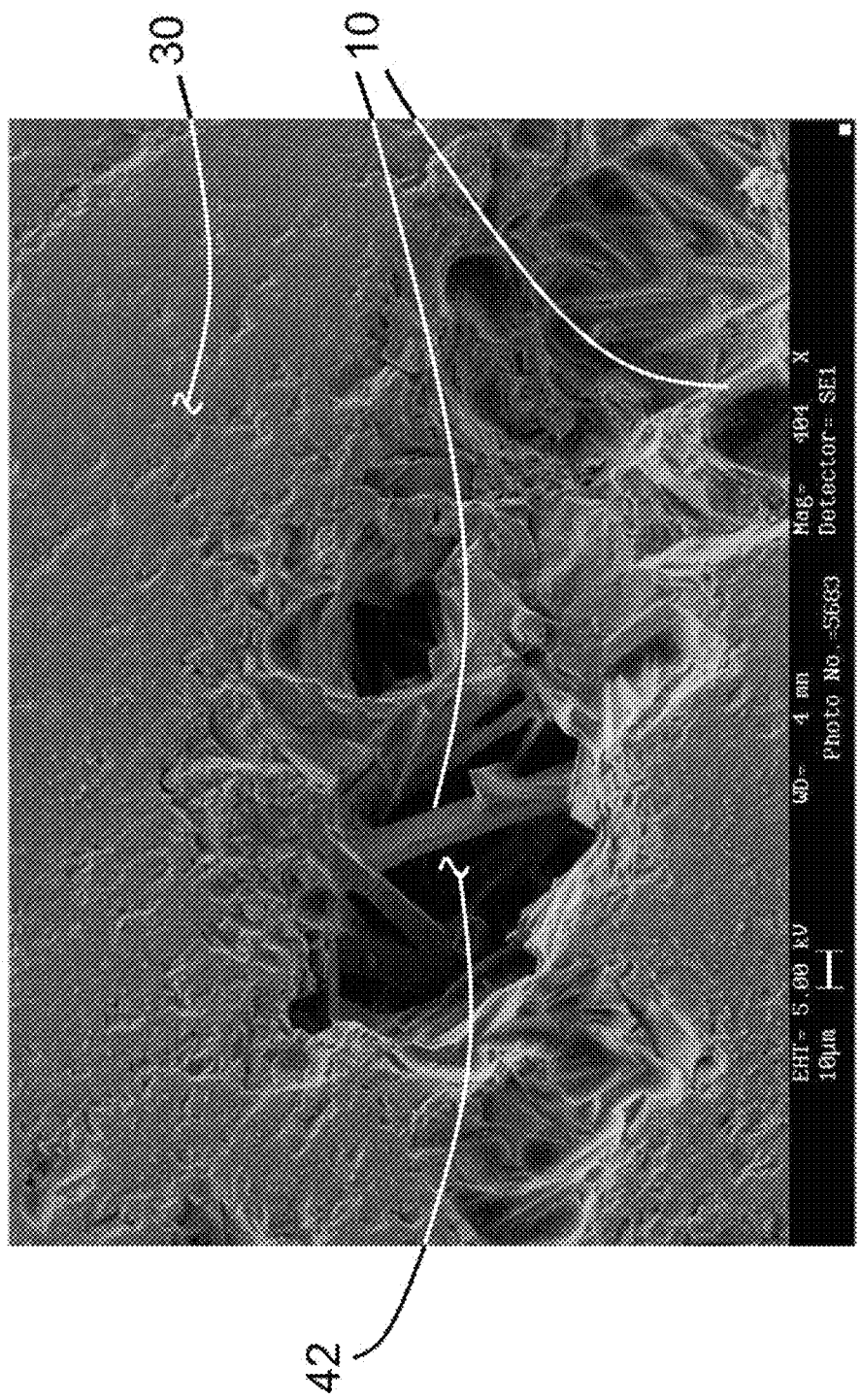
FIG. 2 is a photomicrograph of TiB needles on a Ti substrate.
Figure 3:
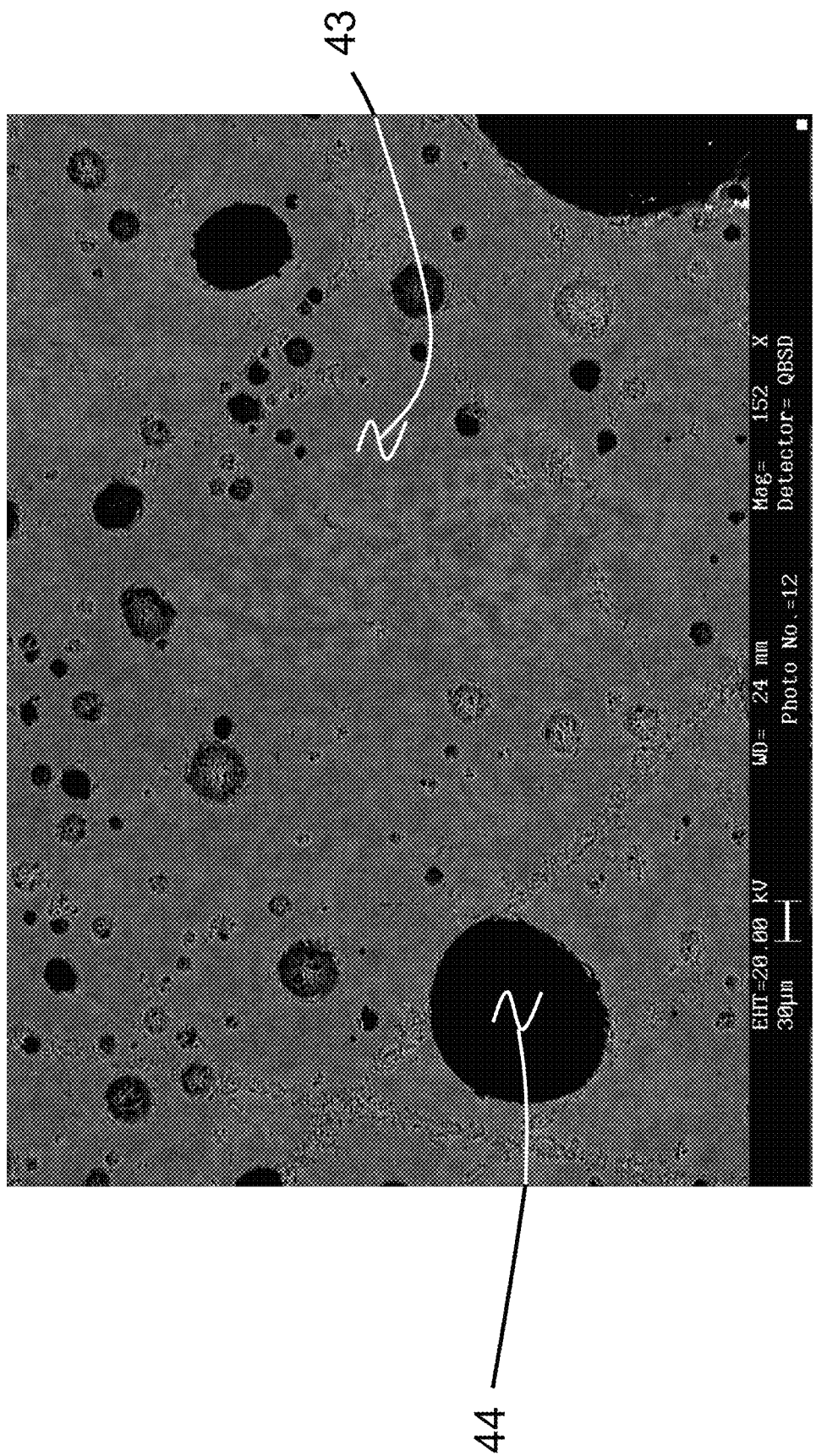
FIG. 3 is a photomicrograph of a Ti metal matrix with TiB needles and pillars disposed on a Ti substrate.
Figure 4:
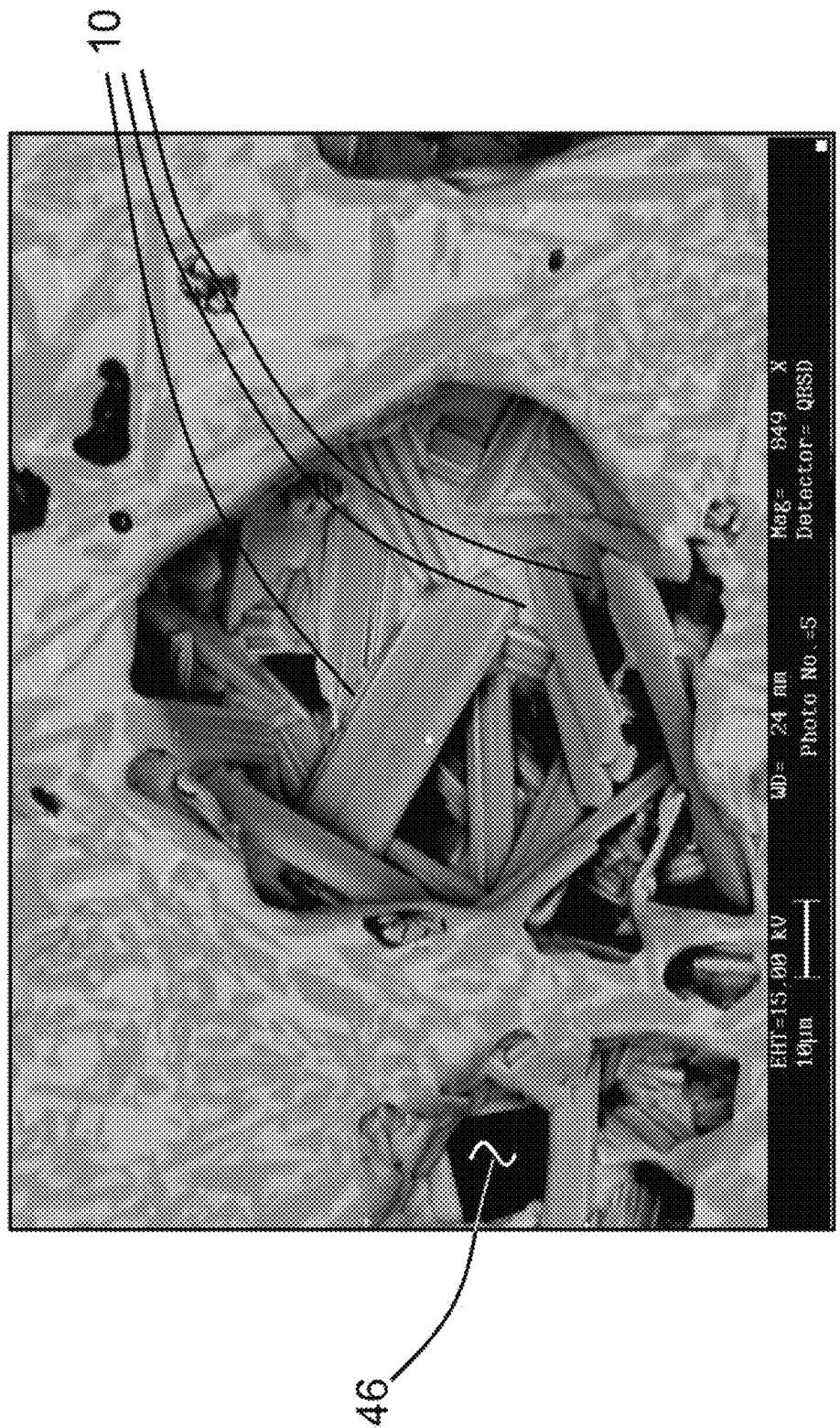
FIG. 4 is a photomicrograph of TiB needles disposed on a Ti substrate.

FIG. 1 illustrates an as-reacted TiB coating morphology on a Ti substrate. Eutectic TiB needles 10 are depicted along with primary TiB pillars 20. The pillars 20 have an aspect ratio (length/width) of between one and five and the needles 10 typically have an aspect ratio of greater than five. Sometimes the needles have an aspect ratio greater than ten. Titanium metal 30 also forms part of this multi-phase microstructure coating on a Ti substrate 40. FIG. 2 illustrates TiB needles 10 along with titanium metal 30 formed as a coating on a Ti substrate 42. FIG. 3 illustrates a Ti metal matrix 43 disposed on a Ti substrate 44. FIG. 4 illustrates TiB needles 10 disposed on a Ti substrate 46.

Some examples of formulations of precursor materials that may be used for formation of reinforced materials are shown in Table 1.

TABLE 1

| | Composition of Precursor Material (Parts by Weight) | | | | | | |
|---|---|---|---|---|---|---|---|
| Formulation No. | $TiB_2$ | CrB | Boric Acid | B | Ti—6-4 | Reaction | Surface Layer Components |
| 1 | 25 | 2.5 | 2.5 | 0 | 0 | $TiB_2 + Ti \rightarrow 2TiB$ | TiB, Ti, & CrB on Ti—6-4 |
| 2 | 25 | 5 | 2.5 | 0 | 0 | $TiB_2 + Ti \rightarrow 2TiB$ | TiB, Ti, & CrB on Ti—6-4 |
| 3 | 25 | 2.5 | 5 | 0 | 0 | $TiB_2 + Ti \rightarrow 2TiB$ | TiB, Ti, & CrB on Ti—6-4 |
| 4 | 25 | 0 | 2.5 | 0 | 0 | $TiB_2 + Ti \rightarrow 2TiB$ | TiB & Ti on Ti—6-4 |
| 5 | 0 | 0 | 2.5 | 15 | 25 | $2Ti + 3B \rightarrow TiB + TiB_2$ | TiB & Ti on Ti—6-4 |
| 6 | 0 | 2.5 | 2.5 | 0 | 25 | [None] | CrB on Ti—6-4 |

Note
that titanium metal, Ti—6-4 powder, or other titanium alloys could be added to any of formulation Nos. 1 through 4.

Figure 5:
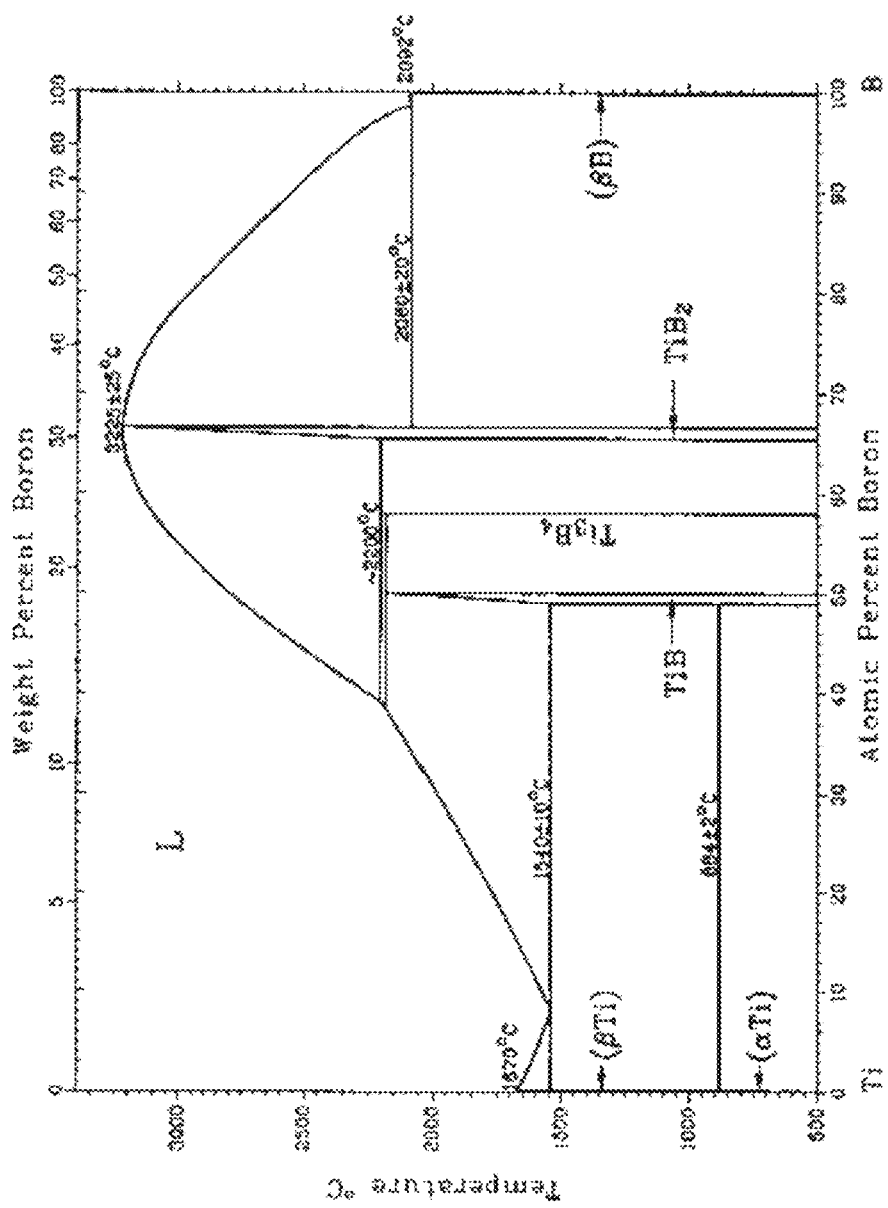
FIG. 5 is a Ti—B phase diagram.

As illustrated in FIGS. 1-4, during the melting of the precursor material, pillar-shaped primary TiB structures (pillars 20) or fine needle-shaped eutectic TiB structures (needles 10) may be formed in the melted region, depending upon the boron content. FIG. 5 presents an equilibrium Ti—B phase diagram. FIG. 5 generally illustrates characteristics of processes and materials described herein, but because of rapid heating and cooling and abrupt changes in material concentration gradients, the compositions and reactions disclosed herein generally represent non-equilibrium conditions that do not precisely conform to FIG. 5. The melting temperature of titanium is approximately 1668° C. and the melting temperature of boron is approximately 2076° C. A precursor material of approximately 98.3 wt. % titanium and approximately 1.7 wt. % boron forms a eutectic reaction which melts the precursor material at approximately 1540° C. When the boron concentration exceeds the eutectic concentration (1.7 wt. %), pillar-shaped (primary) TiB forms first until the concentration of boron decreases to approximately 1.7 wt. %, and then needle-shaped (eutectic) TiB is formed. Substantially only eutectic TiB is formed when the boron concentration value is equal to or below 1.7 wt. %. The pillar-shaped primary TiB is typically hexagonal in cross-section.

The solubility of boron in titanium is nearly zero, and, thus, the TiB phases are substantially only formed during solidification. A hard surface phase separates out in the form of thin ramified crystals that act as micro-reinforcement of a metallic matrix surface. The resulting structures provide an alloy with higher abrasive wear resistance than that provided by primary phase structures. TiB may also improve high-temperature properties, since TiB is insoluble and chemically stable at temperatures over 1000° C.

TiB is a very compatible coating for titanium substrates. TiB has a higher elastic modulus value (371 GPa) than most titanium alloys (100-120 GPa), a coefficient of thermal expansion close to Ti ($6.2 \times 10^{-6}$/° C. for TiB and $8.2 \times 10^{-6}$/° C. for Ti), and a density of 4.56 g/cc compared to 4.5 g/cc for Ti. A powder blend or slurry containing MoB powder, $TiB_2$ powder, and $CaF_2$ flux may be applied to Ti alloy substrates such as Ti-6Al-4V. Mo and Nb powder may be added as β-stabilizing elements. With a powder blend or slurry having a flux mixing ratio of 40 wt. % flux, the melted region typically forms a 1.1. to 1.5 mm thick reacted surface of TiB that is substantially interjoined with the substrate without significant defects. The formation of the TiB in the melted region typically greatly improves the Vickers hardness, high-temperature Vickers hardness, and the wear resistance to levels that may be 2 to 5 times higher than those of the Ti alloy substrate.

The addition of MoB powders to a precursor material allows the fabrication of surface-alloyed materials with various properties by controlling the kind, size, and volume fraction of TiB in the surface matrix. For example, on Ti alloy substrates, the melted region formed by precursor powder blends containing $TiB_2$ and 40 wt % $CaF_2$ flux or $TiB_2$—MoB-40 $CaF_2$ have contained hexagonal-pillar-shaped primary borides and needle-shaped eutectic borides, whereas only needle-shaped eutectic borides have been found when MoB-40 $CaF_2$ blends were used. This is directly related to the amount of boron in the melted region. The $TiB_2$-40$CaF_2$ blend provided the highest hardness and wear resistance. The wear resistance improves as the TiB volume fraction or hardness in the melted region increases. When MoB is added to the blend, Mo dissolves in the Ti matrix and promotes β-Ti transformation since Mo is a β-Ti stabilizer. Since β-Ti is harder than α-Ti, the presence of Mo affects the overall hardness. Additionally, Mo provides a smoother surface important to many wear applications. Titanium has a higher chemical affinity for boron atoms than molybdenum; therefore, TiB forms instead of MoB.

The proper amount of flux prevents oxide formation by protecting the powder melt from air, by decomposing $TiO_2$, and by precipitating borides evenly in the melted region by homogenous melting boride powders. A flux may be specifically selected so that no chemical reaction occurs between the flux and the substrate, and therefore the flux does not affect the composition of the resulting reinforced material. For example, $CaF_2$ flux reacts with $TiO_2$ and $H_2O$ to from CaO which forms as a slag on the surface and prevents oxidation of the melted region by protecting the melted region from the air. The slag does not form part of the reinforced material. Generally it is desirable to use the smallest amount of flux possible to increase the volume fraction of boride and hardness. The resultant surface is typically a uniform, continuous, and crack-free coating with a sound and adherent interface with the metal alloy substrate, such as titanium or steel for examples.

As previously indicated, TiB also plays a role in improving high-temperature properties of a reinforced material, since TiB is insoluble and chemically stable at temperatures over 1000° C. The formation of $TiB_2$ on the surface of a substrate also provides a useful composite structure. Titanium diboride ($TiB_2$) is a ceramic having a semi-metallic nature. A metallic matrix (composite structure) formed of steel and titanium diboride has an abrasive wear resistance that is several times greater then the abrasive wear resistance of steel. The inclusion of TiC is also useful in reinforced materials for steel and other substrates. A precursor powder blend containing $TiB_2$ and TiC with a flux may be sintered at approximately 1232° C. to form a hard-faced coating on metallic substrates. The 1232° C. is lower than the melting temperature of titanium (1668° C.) so that application of the coating at 1232° C. typically does not melt a titanium substrate. In the case of titanium substrates, the TiC is stable with sufficient diffusion at the particle-titanium interface to create good bond strength. The $TiB_2$ particles react with the Ti substrate in-situ, transforming the particulate $TiB_2$ to TiB needles, which further improves the utility of the reinforced material. $TiB_2$ has a hexagonal phase with an "$AlB_2$ structure." In an $AlB_2$ structure, the so-called "X" atoms (Boron) are closely packed in a hexagonal arrangement and the so-called "A" atoms (Ti in the case of $TiB_2$ or Al in the case of $AlB_2$) occupy the triagonal prismatic interstices. The TiB formed by the reaction of Ti and $TiB_2$ occurs predominantly as needles embedded in excess Ti and typically the TiB is of an FeB type structure containing boron chains.

In further embodiments, high wear and corrosion resistant surfaces may be formed on metal alloy substrates as surface alloying or reactive surface modifications by depositing and heating combinations of materials selected from boron, titanium diboride, molybdenum boride, silicon, self-fluxing materials, titanium, chromium boride, chromium, nickel, iron, molybdenum, niobium, and carbides.

Additional examples of precursor materials include self-fluxing materials deposited on substrates by thermal spray, slurry spray, painting, etc., and subsequently interjoined using a heating process (infrared, laser, electron beam, etc.), such as the following:

TABLE 2

| Formulation | Approximate Weight Percentages | | | | | | |
|---|---|---|---|---|---|---|---|
| No. | Cr | B | Fe | Si | C | Ti | Ni |
| 1 | 10. | 2.7 | 2.5 | 2.5 | 0.15 | 1.0 | Balance |
| 2 | 10. | 3.0 | 2.5 | 2.5 | 0.15 | 2.0 | Balance |
| 3 | 10. | 4.8 | 2.5 | 2.5 | 0.15 | 10. | Balance |
| 4 | 17. | 3.5 | 4.2 | 4.0 | 1.0 | 1.0 | Balance |
| 5 | 17. | 3.5 | 4.5 | 4.0 | 1.0 | 2.0 | Balance |

Note that while formulations 2, 3, and 5 are particularly constituted to form a TiB phase, some TiB will form in all formulations because these reactions are typically not run to equilibrium.

Alternative compositions are as follows:

TABLE 3

| Formulation | Approximate Weight Percentages | | | | | | | |
|---|---|---|---|---|---|---|---|---|
| No. | Cr | B | Fe | Si | C | TiB$_2$ | Ti | Ni |
| 6 | 10. | 3.4 | 2.5 | 2.5 | 0.15 | 1.0 | 1.0 | Bal. |
| 7 | 10. | 4.4 | 2.5 | 2.5 | 0.15 | 2.0 | 2.0 | Bal. |
| 8 | 10. | 9.4 | 2.5 | 2.5 | 0.15 | 10. | 10. | Bal. |

Further alternative compositions are as follows:

TABLE 4

| Formulation | Approximate Weight Percentages | | | | | | | |
|---|---|---|---|---|---|---|---|---|
| No. | Ni | Cr | Fe | Si | B | C | Ti | WC-12% Co |
| 9 | 33. | 9.0 | 3.5 | 2.0 | 2.2 | 0.50 | 1.0 | Bal. |
| 10 | 33. | 9.0 | 3.5 | 2.0 | 2.5 | 0.50 | 2.0 | Bal. |

Further alternative compositions are as follows:

TABLE 5

| Formulation | Approximate Weight Percentages | | | | | | | | |
|---|---|---|---|---|---|---|---|---|---|
| No. | Ni | Cr | Fe | Si | B | C | TiB$_2$ | Ti | WC-12% Co |
| 11 | 33. | 9.0 | 3.5 | 2.0 | 2.9 | 0.50 | 1.0 | 1.0 | Bal. |
| 12 | 33. | 9.0 | 3.5 | 2.0 | 3.9 | 0.50 | 2.0 | 2.0 | Bal. |

The columns labeled WC—12% Co in Tables 4 and 5 refer to a matrix of tungsten carbide (WC) and cobalt (Co) where a 12 wt. % of the matrix is cobalt. The matrix is formed not as an aggregate but rather as a composite structure in which the tungsten carbide particles are "wetted" and "bonded" to form an integrated structure.

Boride-containing Ni-based reinforced materials are primarily composed of Ni, Cr, B, Si, and C, typically with Ti or TiB$_2$ which prompts the formation of TiB needles. The B content typically ranges from 1.5 to 3.5% without any Ti or TiB$_2$. The addition of Ti and/or TiB$_2$ requires additional boron. Boron may be added at the ratio of 0.2% B per 1% Ti and 0.7% Ti per 1% TiB$_2$, depending on the Cr content, which is up to about 16%. Higher Cr reinforced materials are generally formulated to contain a large amount of B, which forms very hard chromium borides (~1800 DPH).

These reinforced materials are microstructurally complex compared to conventional hard-facing protective layers. Ti, Ni, Cr, B, and C determine the hardness and type of reinforced material within the structure upon solidification, where B is the primary hard phase forming element for which Ti, Ni, and Cr compete, and C is the second hard phase former. The dominant hard phase for the boride-containing Ni-based reinforced materials are Ni$_3$B, CrB, Cr$_5$B$_3$, TiB$_2$, TiB and complex carbides, M$_{23}$C$_6$ & M$_7$C$_3$ types. The addition of TiB$_2$ in the presence of excess titanium supplies boron for the formation of TiB.

As previously indicated, one purpose of Si is, in conjunction with B, to provide self-fluxing characteristics. But Si is also an important matrix element as a potential promoter of intermetallic precipitates, and consequently Si typically has a major enhancing influence on the wear properties of the reinforced materials. B content influences the level of Si required for silicide (Ni$_3$Si) formation. The higher the B content, the lower the Si content that is required to form silicides.

Boride and carbide dispersions within the microstructure lead to excellent abrasion resistance, with low stress abrasion resistance generally increasing with B and C contents. Boride-containing Ni-based interjoined materials possess moderate resistance to galling but are generally the least resistant to corrosion of the reinforced materials, due to the lack of Cr in the matrix that follows boride and carbide formation.

In some instances, the adhesion of a reinforced material to a substrate may be enhanced by partially melting the substrate surface (or entirely melting the substrate in casting embodiments) to enhance the formation of a reinforced material. For example, the diffusion of materials between a substrate and precursor materials may be enhanced by such melting. Other modifications or enhancements that are enhanced with this method include sintering, alloying and precipitation. These processing techniques may, in turn, be further employed to fuse or harden a reinforced material, or to enhance interjoining of a precursor material and the substrate, or to modify the resultant reinforced material composition or microstructural features in order to achieve specific mechanical, chemical, or electrical properties.

One example of a process where melting the surface of a substrate is beneficial involves the application of boride-containing Ni-based precursor materials developed from brazing alloy compositions to a substrate in a spray and fuse process. Parts (as substrates) may be prepared and coated as in typical thermal spray processes, and the precursor materials may then be interjoined with the substrate by using flame or torch methods, or by using an induction furnace, or by using a vacuum, inert, or hydrogen furnace. During the fusing process, it is believed that oxides within the sprayed coating combine with some of the Si and B to form a borosilicate slag which floats to the surface of the deposit. These Boride-containing Ni-based precursor materials generally fuse between 1010-1175° C., which limits the substrate materials to substrates that can withstand this temperature range, or substrates that can be cooled to prevent substantial melting during processing.

As demonstration of a method for cooling a substrate, aluminum alloy substrates were thermal spray coated with aluminum powder. The substrate was placed on a water-cooled backing plate. The samples were unidirectionally heated in an IR furnace to heat the surface coating and fuse together any pores that formed in the aluminum coating. The IR radiation heated the aluminum coating and the surface of the substrate to a temperature of 950° C. for 60 seconds. Although the aluminum substrate had a melting temperature of 660° C., in this demonstration the process of heating the coating and the substrate to 950° C. did not melt the substrate because of the cooling effect of the backing plate.

Methods described herein have been successfully tested on a variety of coatings which, historically, have proven difficult to apply. For example, the methods may be used to uniformly flux and sinter powder coatings over entire surface areas at a time, effectively eliminating residual coating porosity without heating the underlying substrate to the sintering temperature. Although other methods than those described herein have been used to sinter an entire coating surface at the same time without heating the underlying substrate, they typically produce inconsistent results (e.g., non-uniform sintering) over the treated area. Non-uniform sintering is further exacerbated when irregular surface geometries are being treated. In contrast, the methods described herein may be useful for effectively sintering powder coatings across substrate surfaces having complex geometries.

FIG. 6A depicts an electric arc welding rod 50. The welding rod 50 has a metal electrode 52 and a flux 54 is disposed adjacent a portion of the electrode 52. A precursor material 56 is disposed adjacent a portion of the flux 54. In some embodiments the precursor material 56 may be preformed, such as a powder or glaze that is applied as a step in the manufacture of the welding rod 50. In alternate embodiments the precursor material 56 may be formed in operation, such as by a powder or a glaze that is applied in the field prior to use of the welding rod 50. FIG. 6B depicts another embodiment of an electric arc welding rod, welding rod 60. The welding rod 60 has an electrode 62 and a precursor material 66 is disposed adjacent a portion of the electrode 62. A flux 64 is disposed adjacent a portion of the precursor material. FIG. 6C depicts a further embodiment of an electric arc welding rod, welding rod 70. Welding rod 70 has a metal electrode 72 and a coating 74 is disposed adjacent a portion of the electrode 72. The coating 74 includes a precursor material and in some embodiments may also include a flux. In embodiments where the coating 74 does not include a flux, the welding rod 70 is typically used in an application that provides a protective atmosphere.

In some welding rod embodiments the metal electrode (e.g., 52, 62, or 72 in FIGS. 6A, 6B, and 6C respectively) may be a stiff wire for use in what are commonly called "stick welders." In other embodiments the metal electrode may be a flexible wire for use in what are commonly called "wire-feed welders." In some embodiments the precursor material (e.g., 56, 66, or portions of coating 74 in FIGS. 6A, 6B, and 6C, respectively) comprises titanium diboride and in some embodiments the precursor material comprises titanium monoboride and in some embodiments the precursor material comprises both titanium monoboride and titanium diboride. In some embodiments the precursor material further comprises a β-titanium stabilizer. In some embodiments the precursor material includes titanium metal as a source of available titanium to assist in the formation of a composite structure.

An embodiment of a material for use in forming a composite structure is provided. The material may be in the form of solids (such as a bar, rod or wire), particulates (such as powders or flakes), or a glaze. The material typically comprises a precursor material and a flux. In some embodiments the precursor material comprises titanium diboride and in some embodiments the precursor material comprises titanium monoboride and in some embodiments the precursor material comprises both titanium monoboride and titanium diboride. In some embodiments the precursor material further comprises a β-titanium stabilizer. In some embodiments the precursor material includes titanium metal as a source of available titanium to assist in the formation of a composite structure.

Localized heating sources may be used for original equipment manufacturing of cutting and grinding tools and other articles of manufacture that are subject to severe surface erosion in service. For example, FIG. 7A illustrates a composite structure grinder 80 having a substrate 82. Reinforced material 84 that is configured as lines 86 is interjoined with the substrate 82 to provide the composite structure grinder 80. The width of the lines 86 and the spacing between the lines 86 is typically between approximately one half and one one-hundred-thousandths of the largest physical dimension of the substrate. The reinforced material 84 may be made by disposing precursor materials on the substrate 82 and using a localized heating source such as a scanning laser to heat the precursor material and at least a portion of the substrate 82 in the presence of an oxidation preventative until at least a portion of the precursor material forms a reinforced material 84 as lines 86 interjoined with the substrate 82 to provide the composite structure grinder 80.

FIG. 7B illustrates a composite structure grinder 90 having a substrate 92. Reinforced material 94 configured as spots 96 is interjoined with the substrate 92 to provide the composite structure grinder 90. The width of the spots 96 and the spacing between the spots 96 is typically between approximately one half and one one-hundred-thousandths of the largest physical dimension of the substrate 92. The reinforced material 94 may be made by disposing precursor materials on the substrate 92 and using a localized heating source such as a scanning laser to heat the precursor material and at least a portion of the substrate 92 in the presence of an oxidation preventative until at least a portion of the precursor material forms a reinforced material 94 as spots 96 interjoined with the substrate 92 to provide the composite structure grinder 90.

Localized heating sources may also be used for making composite materials in non-factory environments such as repair shops and field maintenance facilities. For example the cutting edges of heavy excavation and mining machinery are subject to harsh environments that may rapidly erode the cutting surfaces. Localized heating sources may be employed with embodiments described herein to rebuild such cutting surfaces with very hard composite materials.

EXAMPLES

A series of tests were conducted to produce and examine various reinforced materials formed on two substrate materials. The reinforced materials were produced by disposing precursor materials on the substrates and then using a tungsten-inert-gas (TIG) welder with argon as the cover gas to provide heat to melt the precursor materials. FIG. 8A illustrates the layout of a specific test array 100. A titanium substrate 102 was segmented into eight numbered regions (labeled 1 through 8). The combinations of precursor materials that were disposed on the substrate in each of the regions are identified by labeled "row" and "column" headings. For example, region 1 had no precursor material and no flux, and it served as a control specimen. Region 2 had boron (with no flux) as a precursor material; region 3 had $TiB_2$ (with no flux) as the precursor material, and so forth, with region 8 having a mixture of $CrB_2$ and a boric acid flux as the precursor material. To heat the precursor materials for one type of test, the TIG welder was passed across the test array in two transverse lines 104 and 106. In a second type of test the TIG welder also positioned over a series of spots 108, one spot in each of the eight numbered regions. In each of these tests the residence time of the TIG welder at each heated location was of sufficient duration to visually observe that the precursor materials melted under the TIG welder.

FIG. 8B illustrates the layout of a second test array 110. A mild steel substrate 112 was segmented into four numbered regions (labeled 9 through 12). The combinations of precursor materials that were disposed on the substrate in each of the regions are identified by labeled "row" and "column" headings. The TIG welder was passed across the test array in two transverse lines 114 and 116 and the TIG welder was also positioned over a series of spots 118, one spot in each of the four numbered regions. FIG. 8C illustrates the layout of a third test array 120 using a titanium substrate 122. The TIG welder was passed across the test array in three transverse lines 124, 126, and 128. A mixture of boron and boric acid flux was disposed as precursor material on the substrate 122. The transverse line 124 of the TIG welder was made at a power level of 75 amps, the transverse line 126 was made at a power level of 50 amps, and the transverse line 128 was made at a power level of 25 amps.

FIG. 9 is a 50× magnification photomicrograph of a cross section of material taken from the transverse line 104 portion region 1 (as identified in FIG. 8A) of test array 100. Region 1 is an area where no precursor material was applied, so no reinforced material was created interjoined with the titanium substrate 102 and no composite structure was formed. Illustrated in FIG. 9 are hardness test probe marks 150, which are also shown in FIGS. 10-15, 19-22, and 25-27.

FIGS. 10-12 are 50× magnification photomicrographs of reinforced materials 162, 172A, B, and C and 182 interjoined with the titanium substrate 102 of FIG. 8A to form composite structures 164, 174 and 184 respectively. These photomicrographs are cross sections of material taken from the transverse line 104 portions of regions 2, 3, and 4 (respectively) of test array 100. Note that in FIG. 11, three separate forms of reinforced material (172A, 172B, and 172C) are evident.

Figure 14:
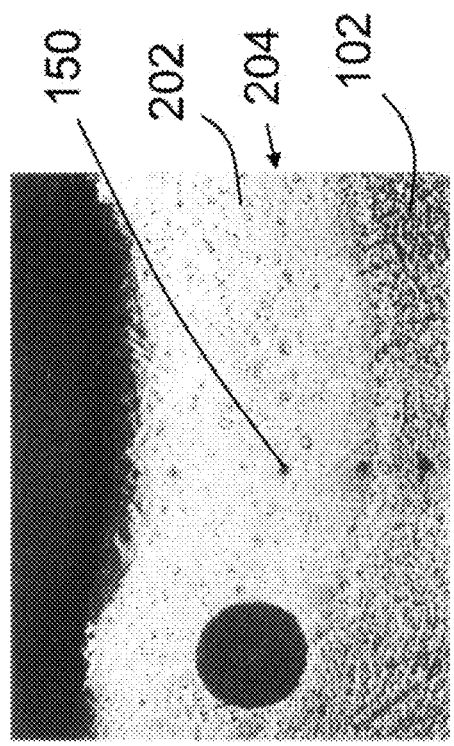
Figure 16:
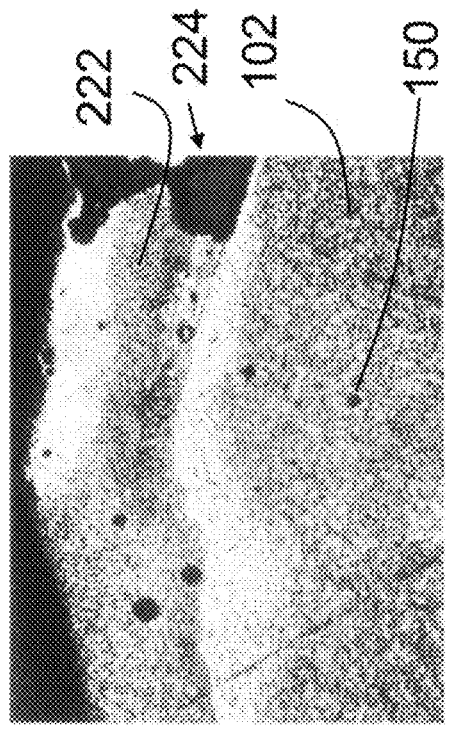
Figure 13:
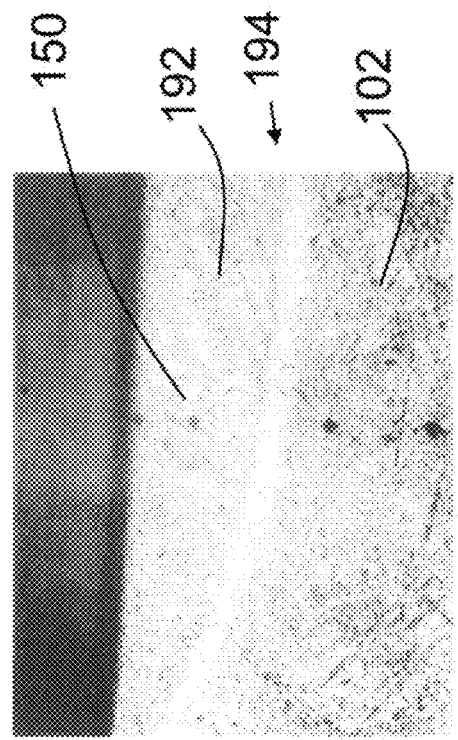
Figure 15:
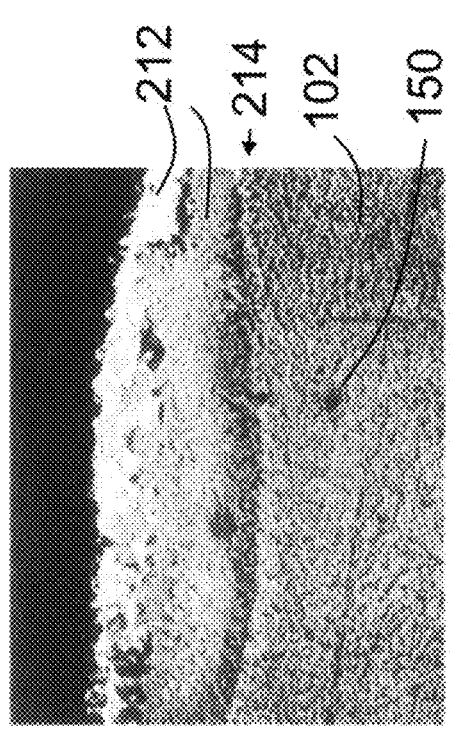

FIG. 13 is a 50× magnification photomicrograph of a cross section of material taken from the transverse line 106 portion of region 5 (as identified in FIG. 8A) of test array 100. Region 5 is an area where a boric acid flux was applied. In addition to being a flux, the boric acid was a "precursor material" (as the term is used herein) because the boron in the flux formed reinforced material 192 that was interjoined with the titanium substrate 102 to form a composite structure 194. FIGS. 14-16 are 50× magnification photomicrographs of reinforced materials 202, 212 and 222 interjoined with the titanium substrate 102 of FIG. 8A to form composite structures 204, 214 and 224, respectively. FIGS. 14 and 16 are cross sections of material taken from the transverse line 106 portions of regions 6 and 8 (respectively) of test array 100. FIG. 15 is a cross section of material taken from the spot 108 portion of region 7 of test array 100.

Figure 17:
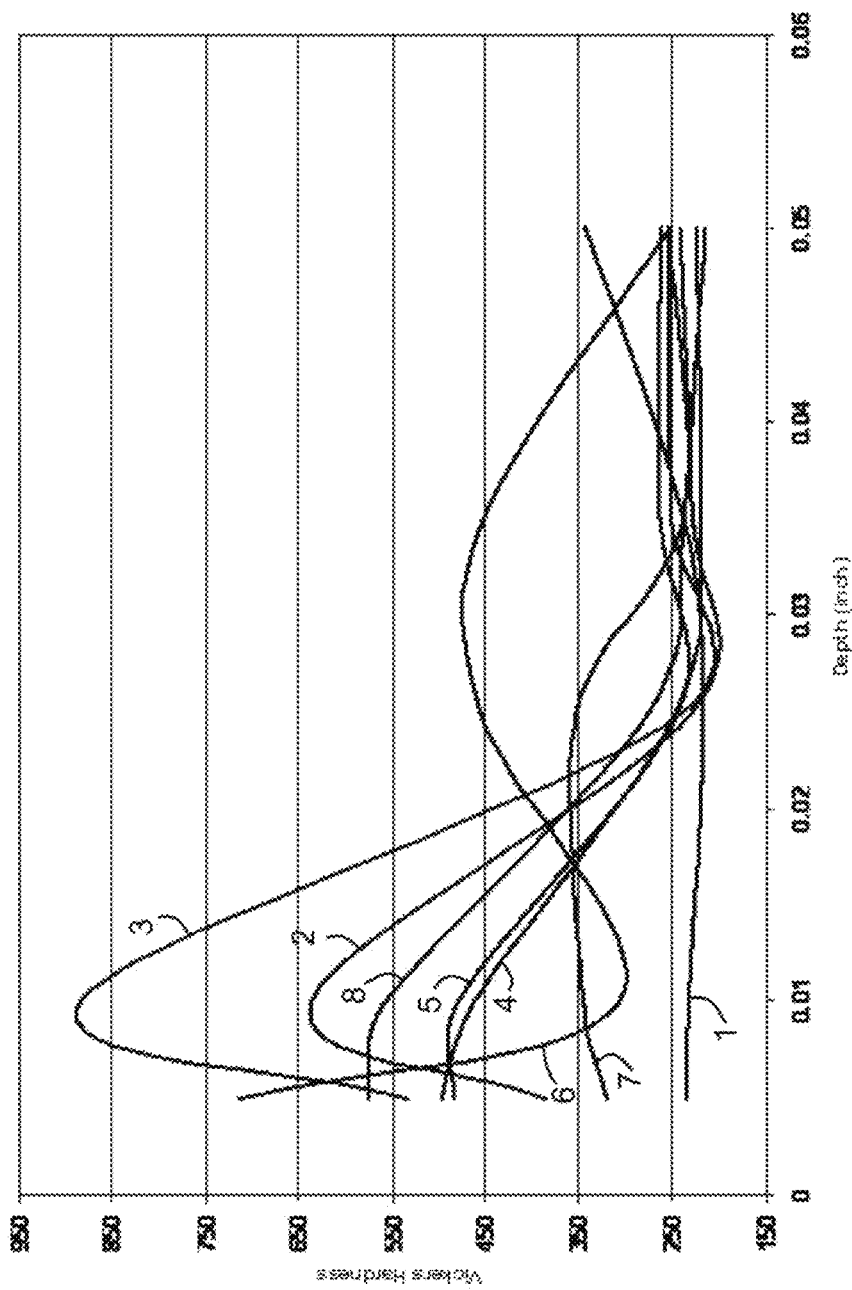
FIGS. 17 and 18 are plots of hardness values at measured depths near the surfaces of the structures of FIGS. 9-16.

FIG. 17 is a plot of Vickers hardness measurements taken at cross sections sampled from the spots associated with regions 1-8 of FIG. 8A, at various depths below the exposed surface of reinforced materials formed at those spots (or at various depths below the exposed surface of the substrate in the case of the spot portion of region 1). The hardness near the surface of the reinforced materials is higher than the hardness of the substrate near its surface where (again, as illustrated by the spot portion of region 1) reinforced material was not formed adjacent the surface of the substrate.

Figure 18:
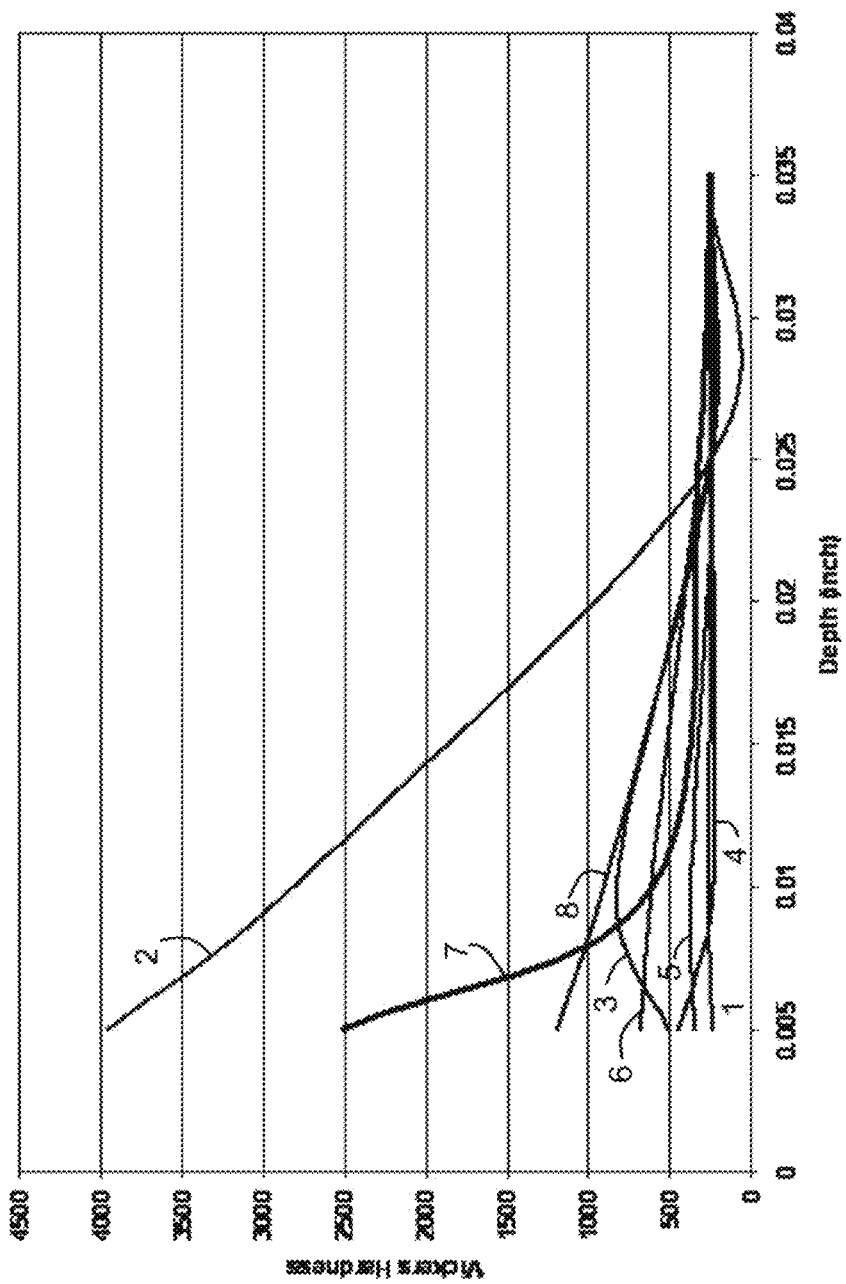

FIG. 18 is a plot of Vickers hardness measurements taken at cross sections sampled from the transverse lines 104 and 106 associated with regions 1-8 of FIG. 8A. The hardness near the surface of the reinforced materials is higher than the hardness of the substrate near its surface where (as illustrated by curve 1 taken from transverse line 104 in region 1) reinforced material was not formed adjacent the surface of the substrate.

Figure 19:
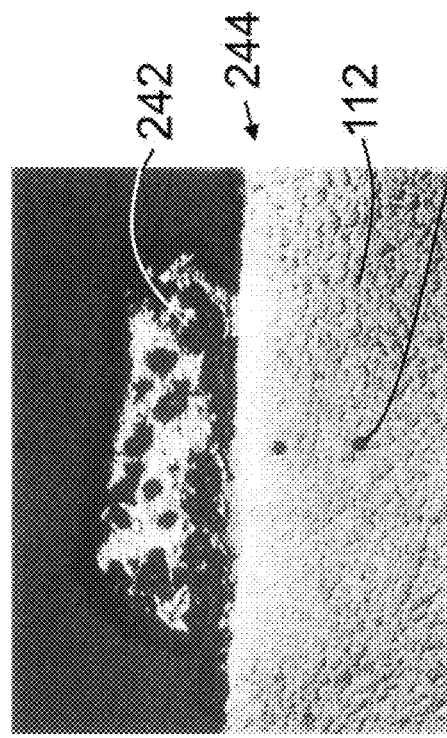
FIGS. 19-22 are photomicrographs of reinforced materials interjoined with a mild steel substrate.
Figure 20:
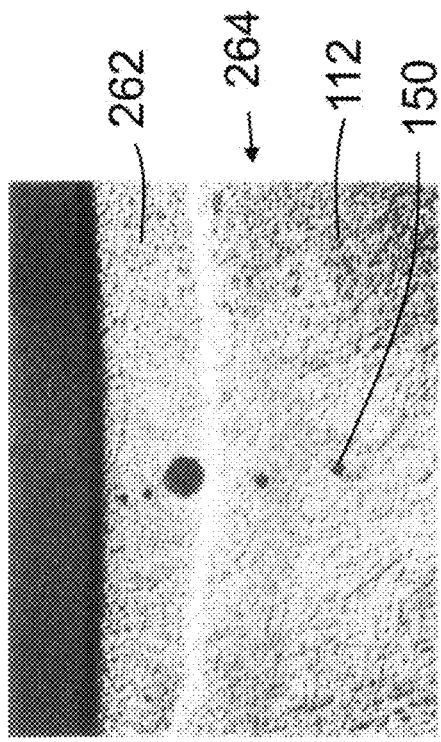
Figure 21:
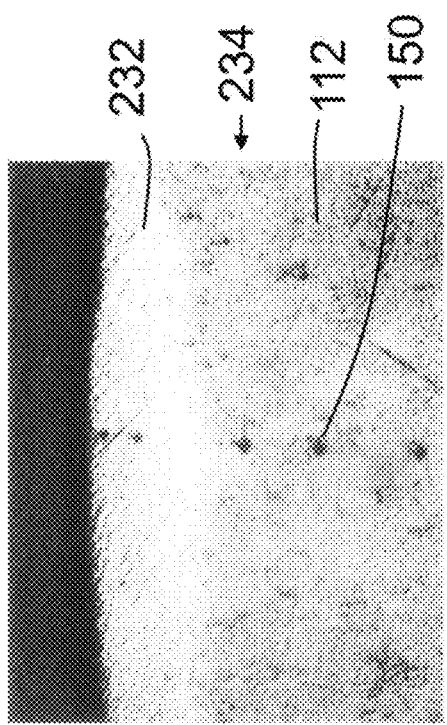
Figure 22:
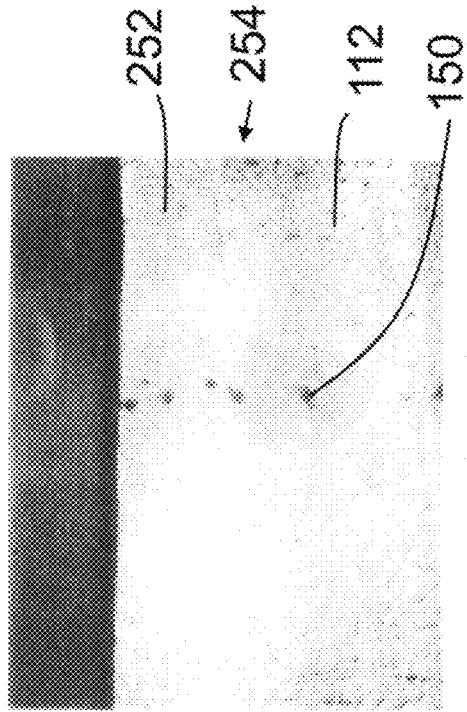

FIGS. 19-22 are 50× magnification photomicrographs of reinforced materials 232, 242, 252 and 262 interjoined with the mild steel substrate 112 to form composite structures 234, 244, 254 and 264 respectively. FIGS. 19 and 20 are cross sections of material taken from the transverse line 114 portions of regions 9 and 10 (respectively) of test array 110 shown in FIG. 8B. FIG. 21 is a cross section of material taken from the spot portion of region 11 of test array 110. FIG. 22 is a cross section of material taken from the transverse line 116 portion of region 12 of test array 110 shown in FIG. 8B.

Figure 23:
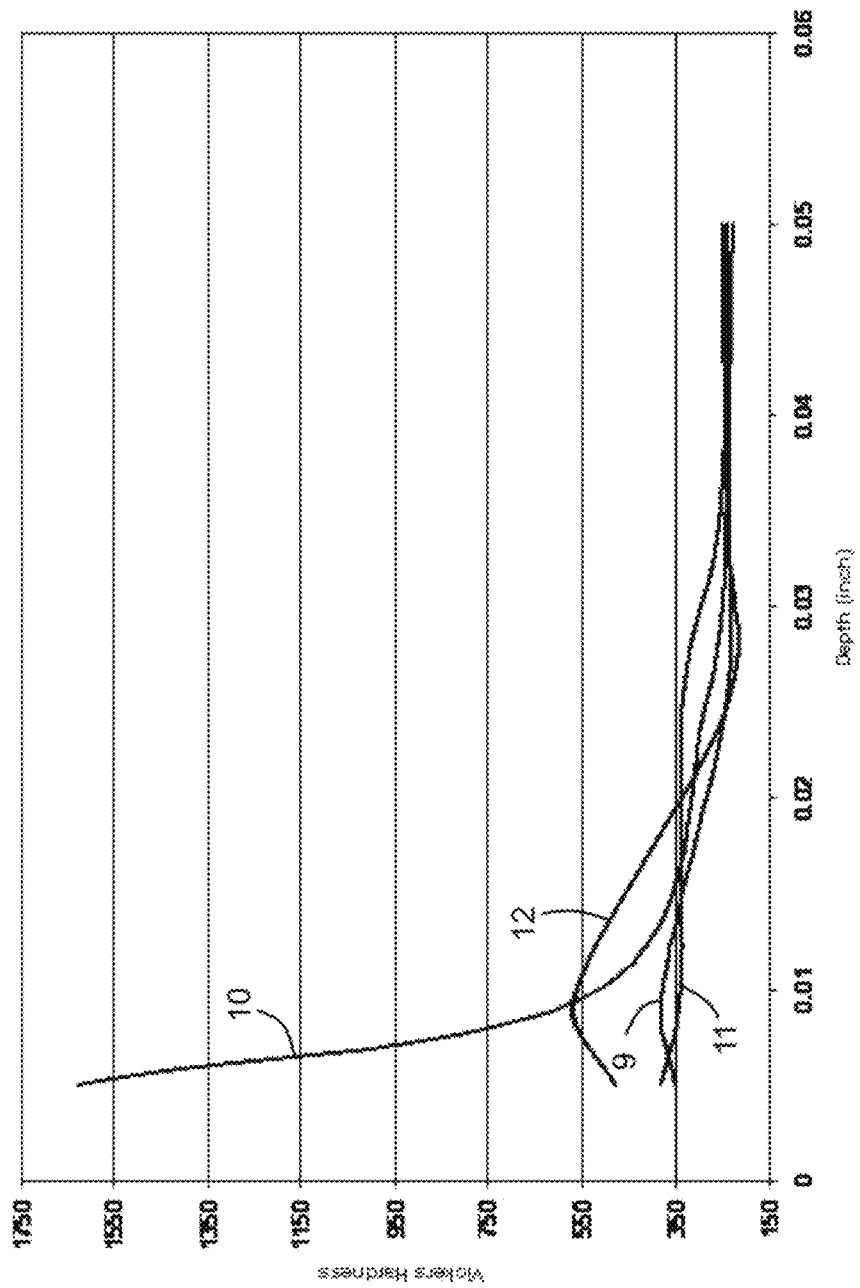
FIGS. 23 and 24 are plots of hardness values at measured depths near the surfaces of the structures of FIGS. 19-22.
Figure 24:
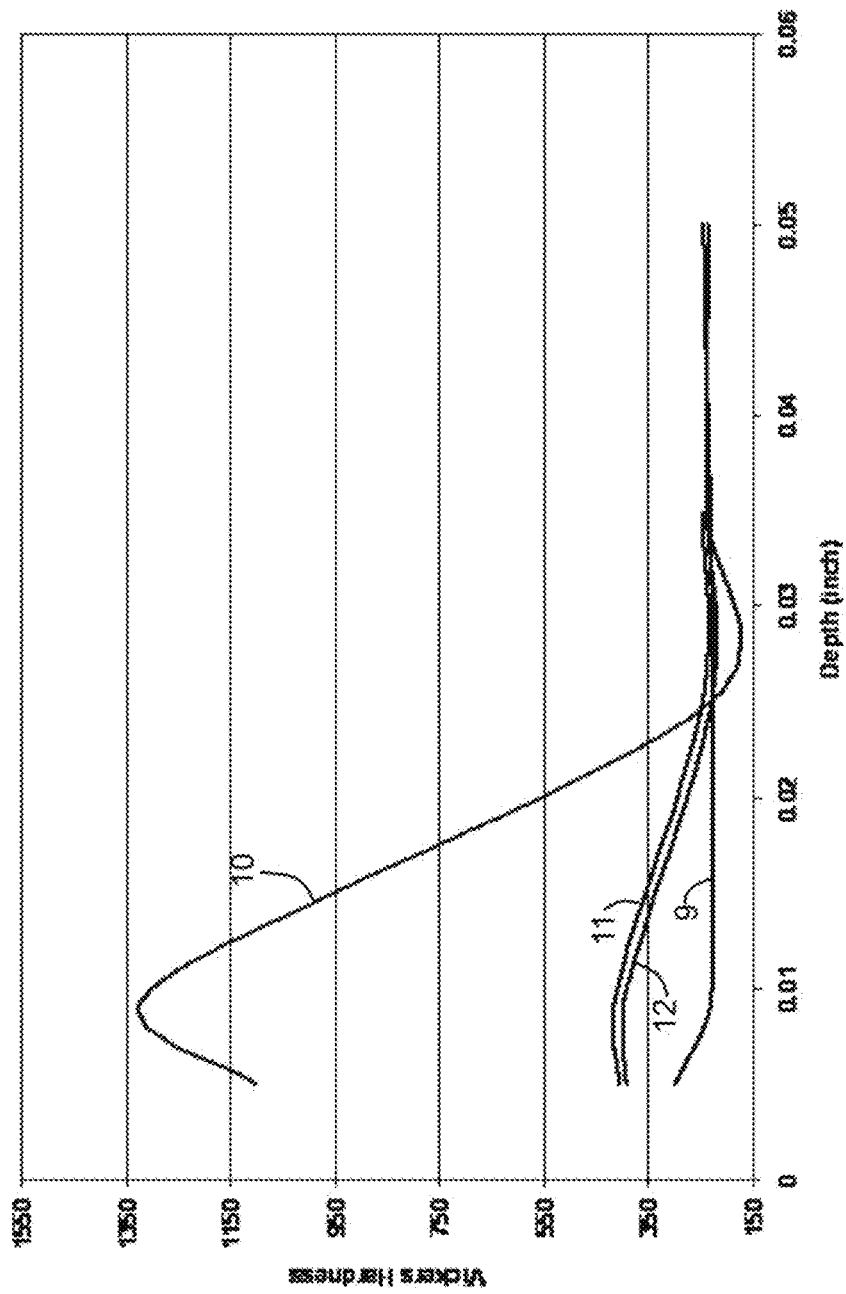

FIG. 23 is a plot of Vickers hardness measurements taken at cross sections sampled from the spots associated with regions 9-12 of FIG. 8B, at various depths below the exposed surface of reinforced materials formed at those spots. FIG. 24 is a plot of Vickers hardness measurements taken at cross sections sampled from the transverse lines 114 and 116 associated with regions 9-12 of FIG. 8B. The hardness near the surface of the reinforced materials is higher than the hardness of the substrate.

Figure 25:
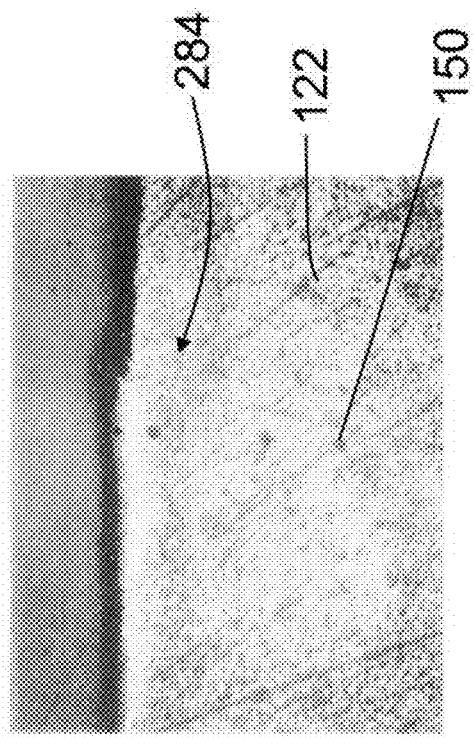
FIGS. 25-27 are photomicrographs of reinforced materials interjoined with a Ti substrate.
Figure 26:
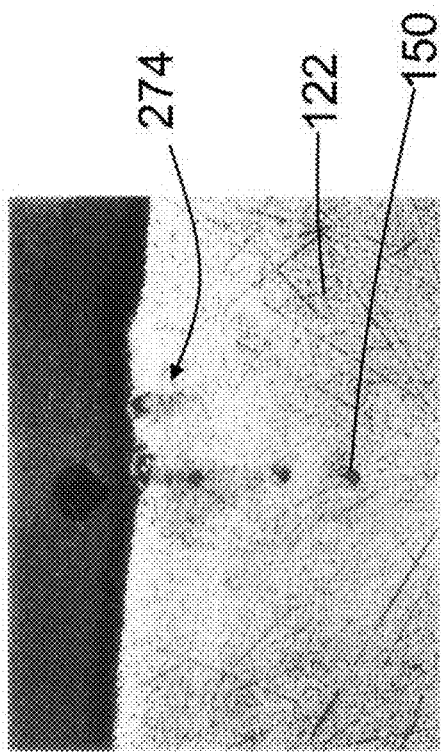
Figure 27:
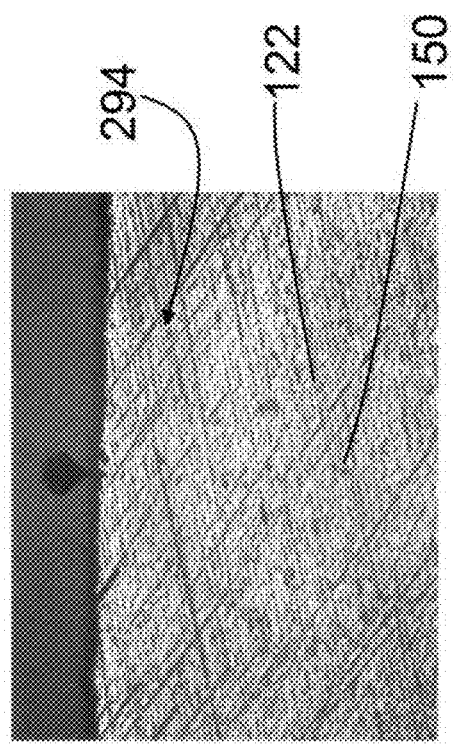

FIG. 25 is a 50× magnification photomicrograph of a composite structure 274 formed on the titanium substrate 122 where boron and boric acid flux were the precursor materials and heat was provided by a TIG welder at 75 amps (transverse line 124 on FIG. 8C). FIG. 26 is a 50× magnification photomicrograph of a composite structure 284 formed on the titanium substrate 122 where boron and boric acid flux were the precursor materials and heat was provided by a TIG welder at 50 amps (transverse line 126 on FIG. 8C). FIG. 27 is a 50× magnification photomicrograph of a composite structure 294 formed on the titanium substrate 122 where boron and boric acid flux were the precursor materials and heat was provided by a TIG welder at 25 amps (transverse line 128 on FIG. 8C). In the photomicrographs of FIGS. 25-27 there are no obvious lines of demarcation between reinforced material and substrate material.

Figure 28:
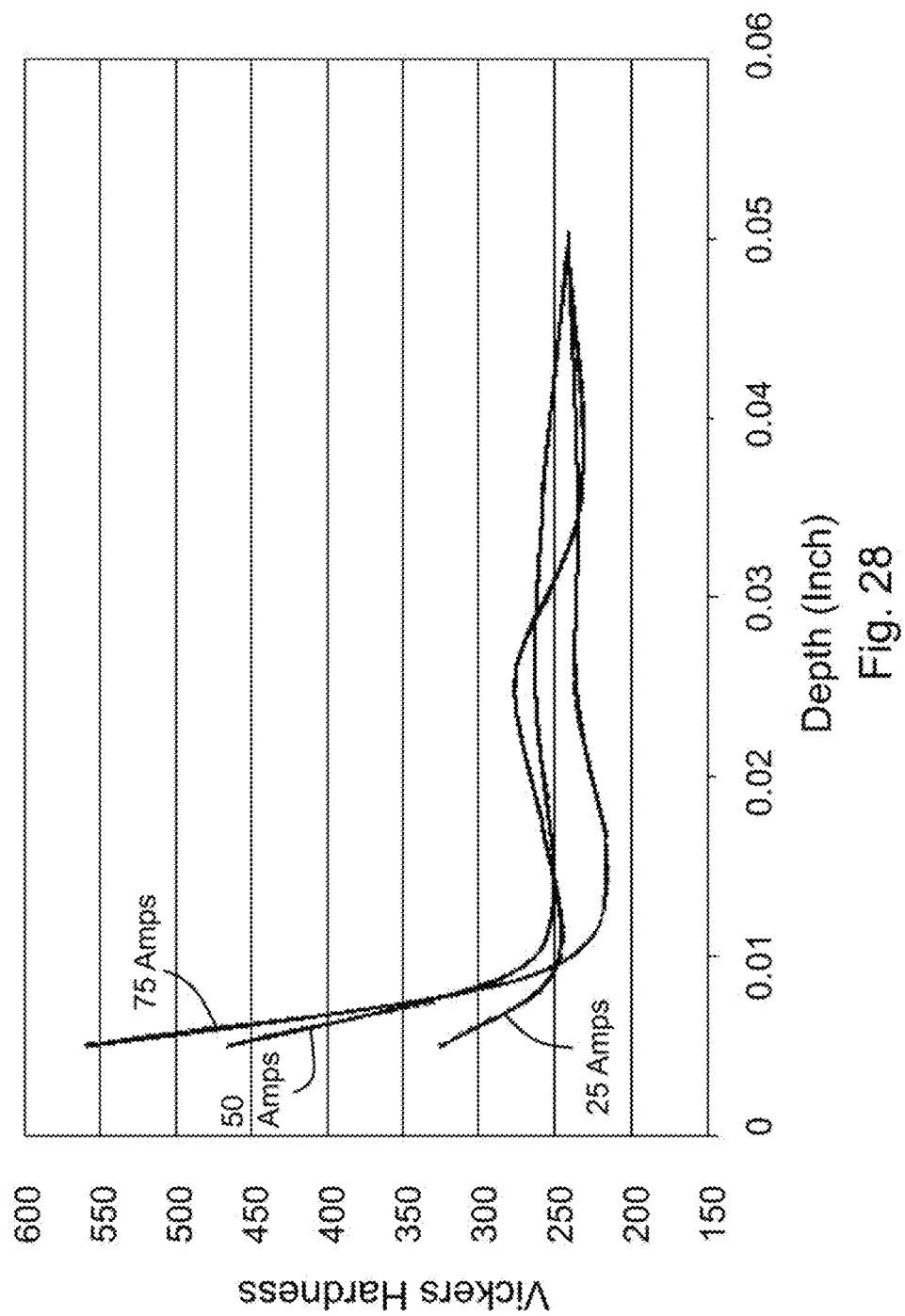
FIG. 28 is a plot of hardness values at measured depths near the surfaces of the structures of FIGS. 25-27.

FIG. 28 is a plot of Vickers hardness measurements taken from cross sections of FIGS. 25, 26 and 27, which where sampled from the transverse lines 124 (75 Amps), 126 (50 Amps) and 128 (25 Amps) depicted in FIG. 8C.

In summary, embodiments disclosed herein provide composite structures that include a reinforced material interjoined with a substrate and methods of forming a reinforced material interjoined with a surface of a substrate to form a composite structure. The foregoing descriptions of embodiments of the disclosure have been presented for purposes of illustration and exposition. They are not intended to be exhaustive or to limit the disclosed embodiments to the precise forms disclosed. Obvious modifications or variations are possible in light of the above teachings. The embodiments are chosen and described in an effort to provide the best illustrations of the principles of the disclosed embodiments and its practical application, and to thereby enable one of ordinary skill in the art to utilize the various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of making a composite structure, the method comprising the steps:
   (a) heating at least a surface portion of a substrate to a temperature above the melting point of the substrate;
   (b) disposing a precursor material comprising titanium and a boron source on the at least a surface portion of the substrate; and
   (c) forming a reinforced material with the precursor material interjoined with the at least a surface portion of the substrate to provide the composite structure.

2. The method of claim 1 wherein:
   step (a) comprises melting an entire portion of the substrate; and
   step (b) comprises flowing the melted substrate into a mold cavity coated with the precursor material.

3. The method of claim 1 wherein step (b) comprises disposing a precursor material comprising titanium diboride and a β-titanium stabilizer on the at least a portion of the substrate.

4. The method of claim 1 wherein step (b) comprises disposing a slurry, glaze, or paste comprising titanium diboride on the heated surface portion of the substrate.

5. The method of claim 1 wherein the substrate is a titanium-bearing substrate.

6. The method of claim 1 wherein the substrate is an iron-bearing substrate.

7. The method of claim 1 wherein the substrate is an aluminum-bearing substrate.

8. The method of claim 1 wherein the substrate is a non-titanium bearing substrate.

9. The method of claim 1 wherein the reinforced material includes a compound selected from the group consisting of titanium monoboride, titanium diboride, and combinations thereof disposed at least partially below the surface portion of the composite structure.

10. A method of making a composite structure, the method comprising the steps:
    (a) coating a mold cavity with a precursor material comprising titanium and a boron source;
    (b) melting a substrate;
    (c) flowing the melted substrate into the mold cavity; and
    (d) forming a reinforced material in the mold cavity with the precursor material interjoined with a surface portion of the substrate to provide the composite structure.

11. The method of claim 10 wherein the precursor material includes a slurry, glaze, or paste comprising titanium diboride.

12. The method of claim 10 wherein the substrate is a titanium-bearing substrate.

13. The method of claim 10 wherein the substrate is an iron-bearing substrate.

14. The method of claim 10 wherein the substrate is an aluminum-bearing substrate.

15. The method of claim 10 wherein the substrate is a non-titanium bearing substrate.

16. The method of claim 10 wherein the reinforced material includes a compound selected from the group consisting of titanium monoboride, titanium diboride, and combinations thereof disposed at least partially below the surface portion of the composite structure.

17. A method of making a composite structure, the method comprising the steps:
    (a) heating at least a surface portion of a substrate to a temperature above the melting point of the substrate;
    (b) disposing a precursor material comprising titanium and a boron source on the at least a surface portion of the substrate;
    (c) maintaining the temperature of the at least a surface portion of the substrate above the melting point of the substrate until the precursor material diffuses into the at least a surface portion of the substrate; and
    (d) forming a reinforced material with the precursor material intermingled with the at least a surface portion of the substrate to provide the composite structure.

18. The method of claim 17 wherein the maintaining step includes exposing the at least a surface portion of the substrate to the temperature slightly above the melting point of the substrate from 1 to 300 seconds.

19. The method of claim 17 wherein the maintaining step includes exposing the at least a surface portion of the substrate to the temperature slightly above the melting point of the substrate from 30 to 60 seconds.

20. The method of claim 17 wherein the maintaining step includes maintaining the temperature slightly above the melting point of the substrate for up to a few seconds.

21. The method of claim 17 wherein the substrate is one of a titanium-bearing substrate and an iron-bearing substrate.

22. The method of claim 17 wherein the substrate is an aluminum-bearing substrate.

* * * * *